US006001452A

United States Patent [19]

Bassett et al.

[11] Patent Number: 6,001,452

[45] Date of Patent: Dec. 14, 1999

[54] ENGINEERED STRUCTURAL WOOD PRODUCTS

[75] Inventors: Kendall H. Bassett, Tacoma; Alkivadis G. Dimakis, Federal Way; Earl D. Hasenwinkle, Puyallup; John W. Kerns, Puyallup; John S. Selby, Puyallup; Richard E. Wagner, Auburn; Ronald C. Wilderman, Sumner, all of Wash.

[73] Assignee: Weyerhaeuser Company, Tacoma, Wash.

[21] Appl. No.: 08/708,273

[22] Filed: Sep. 3, 1996

[51] Int. Cl.[6] .......... B32B 5/12

[52] U.S. Cl. .......... 428/105; 428/106; 428/109; 428/110; 428/114; 428/212; 428/218; 428/537.1

[58] Field of Search .......... 428/106, 105, 428/109, 110, 114, 537.1, 212, 218; 156/299

[56] References Cited

U.S. PATENT DOCUMENTS

| | | | |
|---|---|---|---|
| 1,594,889 | 8/1926 | Loetscher | 144/351 |
| 1,778,333 | 10/1930 | Neumann | 144/350 |
| 2,942,635 | 6/1960 | Horne | 144/332 |
| 3,445,325 | 5/1969 | Clark | 161/166 |
| 3,591,448 | 7/1971 | Elmendorf | 161/164 |
| 3,813,842 | 6/1974 | Troutner | 52/693 |
| 4,061,819 | 12/1977 | Barnes | 428/294 |
| 4,355,754 | 10/1982 | Lund et al. | 238/83 |
| 4,413,459 | 11/1983 | Lambuth | 52/729 |
| 4,476,663 | 10/1984 | Bikales | 52/730 |
| 5,034,259 | 7/1991 | Barker | 428/106 |
| 5,050,653 | 9/1991 | Brown | 144/351 |
| 5,096,765 | 3/1992 | Barnes | 428/106 |
| 5,299,400 | 4/1994 | Sing | 52/309.9 |

FOREIGN PATENT DOCUMENTS

| | | |
|---|---|---|
| 1014000 | 5/1952 | France . |
| 1134435 | 4/1957 | France . |
| 2677692 | 12/1992 | France . |
| 328681 | 5/1958 | Switzerland . |
| 424174 | 5/1967 | Switzerland . |
| 480518 | 12/1969 | Switzerland . |
| WO 96/13361 | 5/1996 | WIPO . |

OTHER PUBLICATIONS

Koch, Peter Beams from boltwood: a feasibility study. Forest Products Journal,14 (11): 497–500 (1964).

Schaffer et al. Feasibility of producing a high–yield laminated structure. USDA Forest Service Research Paper FPL 175 (1972).

Megraw, R.A. Wood quality factors in loblolly pine. pp. 33–36, Tappi Press, Atlanta GA (1985).

New Zealand Radiata Pine and Douglas Fir: Suitability for processing by D. J. Crown, FRI Bulletin 168, pp. 1–7 & 39–41, 1992.

*Primary Examiner*—Nasser Ahmad

[57] ABSTRACT

The invention comprises engineered structural wood products particularly useful in critical applications such as joists, headers, and beams where longer lengths, greater widths, and higher and predictable stress ratings may be required. The invention is also directed to a method for making the wood products. Most logs by nature are radially anisotropic, having wood of higher density and stiffness in their outer portion adjacent the bark than is found in the inner portion. The logs are machined to segregate the denser, stiffer outer wood. A first generally rectangular component is formed from the less dense inner wood. Second generally rectangular components are formed from the stiffer outer wood. Second components are adhesively bonded to at least one edge of the first component, more usually to opposite edges. The stiffer wood is thus specifically placed where it will contribute most effectively to the properties of the product. The product is analogous to an I-beam in which the lower density first component serves as the web and the higher density second component as the flange portion The products can be handled in use in identical fashion to solid sawn lumber. They are characterized by much less variation in their stiffness than solid sawn visually or machine graded products and can be made in a wide range of width, thickness, and length.

25 Claims, 18 Drawing Sheets

Fig. 8
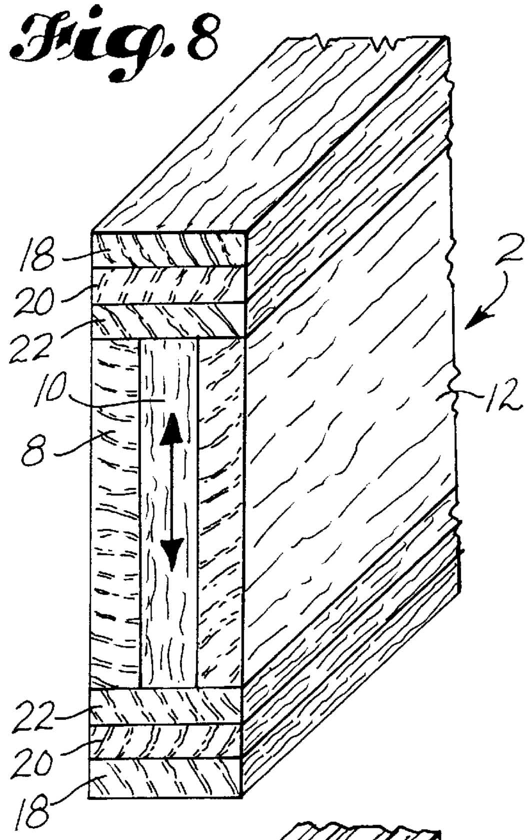
Fig. 9
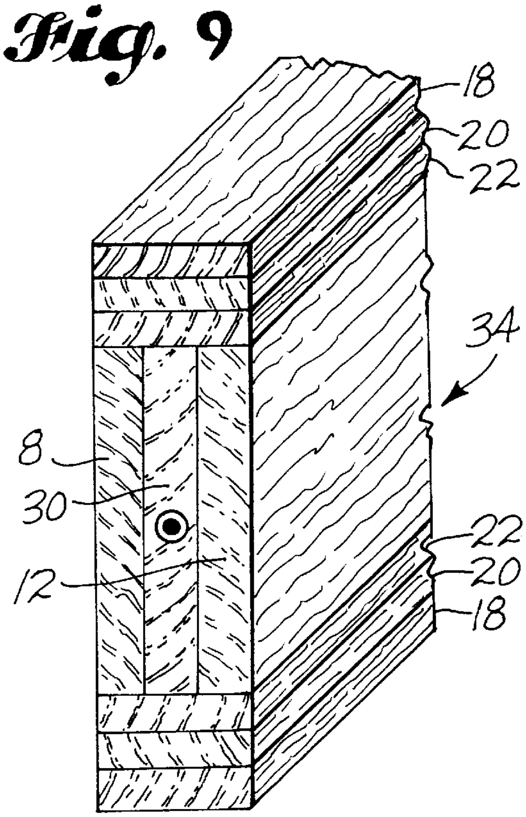
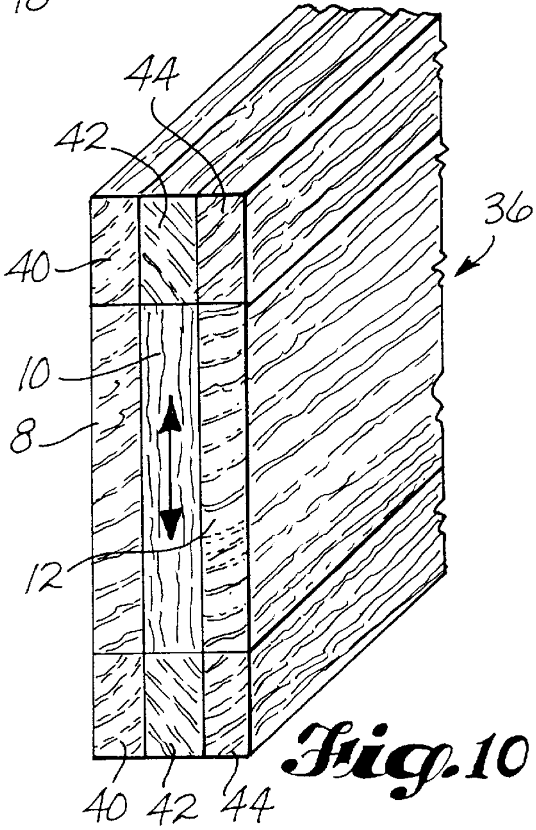
Fig. 10
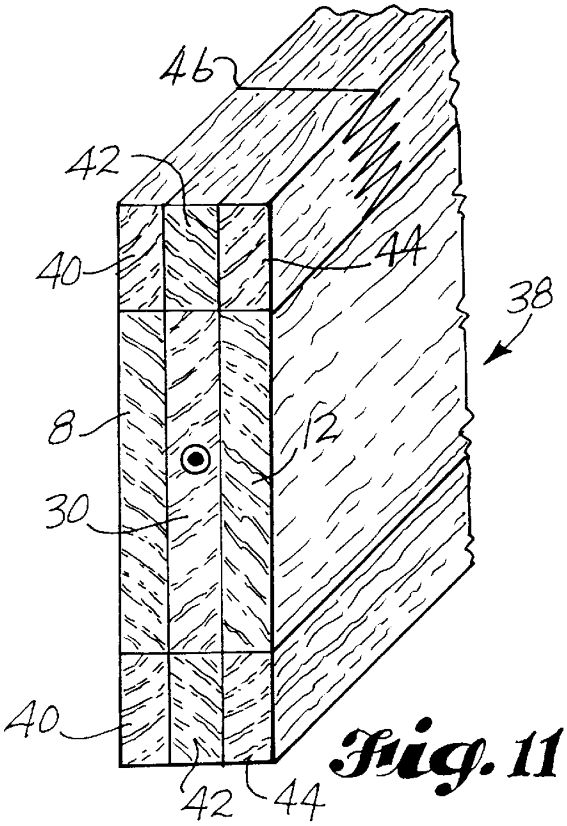
Fig. 11

ENGINEERED STRUCTURAL WOOD PRODUCTS

The present invention is directed to engineered structural wood products particularly useful in critical applications such as joists, headers, and beams where longer lengths, greater widths, and predictable stress allowance, may be required. The invention is also directed to a method for making the wood products.

BACKGROUND OF THE INVENTION

Sawn lumber in standard dimensions is the major construction material used in framing homes and many commercial structures. The available old growth forests that once provided most of this lumber have now largely been cut. Most of the lumber produced today is from much smaller trees from natural second growth forests and, increasingly, from tree plantations. Intensively managed plantation forests stocked with genetically improved trees are now being harvested on cycles that vary from about 25 to 40 years in the pine region of the southeastern and south central United States and about 40 to 60 years in the Douglas-fir region of the Pacific Northwest. Similar short harvesting cycles are also being used in many other parts of the world where managed forests are important to the economy. Plantation thinnings, trees from 15 to 25 years old, are also a source of small saw logs.

Whereas old growth trees were typically between two to six feet in diameter at the base (0.6 m to 1.8 m), plantation trees are much smaller. Rarely are they more than two feet (0.6 m) at the base and usually they are considerably less than that. One might consider as an example a typical 35 year old North Carolina loblolly pine plantation tree on a good growing site. The site would have been initially planted to about 900 trees per hectare (400 per acre) and thinned to half that number by 15 years. A plot would often have been fertilized one or more times during its growth cycle, usually at ages 15, 20 and 25 years. A typical 35 year old tree at harvest would be about 40 cm (16 in) diameter at the base and 15 cm (6 in) at a height of 20 m (66 ft). Trees from the Douglas-fir region would normally be allowed to grow somewhat larger before harvest.

American construction lumber, so-called "dimension lumber", is nominally 2 inches (actually 1½ inches (38 mm)) in thickness and varies in 2 inch (51 mm) width increments from 3½ inches to 11¼ inches (89 mm to 285 mm), measured at about 12% moisture content. Lengths typically begin at 8 feet (2.43 m) and increase in 2 foot (0.61 m) intervals up to 20 ft (6.10 m). Unfortunately, when using logs from plantation trees it is now no longer possible to produce the larger and/or longer sizes and grades in the same quantities as in the past.

There is another problem with plantation wood that is not as generally recognized as are the size limitations. Typically, in plantation wood the average wood density is lower than old growth wood. This, in turn, affects strength and stiffness. Strength in flexure, otherwise termed modulus of rupture, and especially the stiffness measured as modulus of elasticity in flexure, may be somewhat lower and possibly more variable than old growth wood. This is a problem for members used in a bending situation and it can be for those members used in compression; e.g. longer wall studs. Typical of bending uses are floor joists, truss members, and headers over wide windows and doors, such as garage doors.

The trunk of a tree may be visualized as a stack of hollow cones of ever increasing length and base diameter and ever decreasing included angle. Each cone depicts a single annual growth increment that proceeds from the top of the tree to the base. Until after about 15 annual growth rings have been formed, wood at any height above the base in the southern pine species and Douglas-fir has juvenile properties characterized by relatively wide growth rings and relatively low density. For loblolly pine trees older than about 15 years (about 20 years for Douglas-fir), in any given growth year the wood in the upper part of the conical growth increment still has juvenile characteristics while the wood at the base of the same annual growth increment is of a denser more mature type. Thus, a tree might be visualized as having a cylinder of juvenile-type wood about 15 growth rings wide running the entire length to the point of its minimum diameter useable as a saw log. If a saw log taken from the top of the tree has only about fifteen growth rings or less it will consist almost entirely of relatively low density juvenile wood. Beyond that age, wood of mature characteristics will be found only in the outer portions of the tree. One of the characteristics of the more mature wood is a significantly higher density with, generally, a higher ratio of late wood to early wood and narrower ring spacing than that of the juvenile wood.

As growth progresses the core portion of the tree becomes infused with resinous and other materials and ceases to be a physiologically functioning part of the plant. The function of this resinous heartwood, as it is called, is essentially that of structural support. The change to heartwood does not significantly affect strength, however. The juvenile characteristics of the wood remains unchanged.

Since loblolly pine (*Pinus taeda L.*) and its closely related southern pines are particularly important timber species they will be used in the following discussion as a non-limiting example of trees in general. Along any given radius density increases approximately linearly from the pith to about 15 years of age beyond which time there is little further increase. Douglas-fir has a somewhat different pattern. Density will normally decrease for eight to ten rings outward from the pith then gradually increase for fifty rings or more.

A frequently used unit related to density is specific gravity measured as oven dry weight/green volume. For loblolly pine, near the base of the tree specific gravity of the first several growth rings surrounding the pith will typically range around 0.38. By about age 20 the wood being formed near the bark at the same height will have a specific gravity of about 0.51–0.56. Density even of the outer mature wood portion of the tree varies longitudinally along the tree, being generally lower in the upper portions. Density of woods has been shown to correlate directly with stiffness, measured as modulus of elasticity in flexure.

R. A. Megraw, in *Wood Quality Factors in Loblolly Pine,* TAPPI Press, Atlanta, Ga. (1985) discusses in depth the influence of tree age, location in the tree, and cultural practice on wood specific gravity, and fiber length. He observes as noted above that inner growth rings (out to about 15 years) are wider with lower specific gravity while those beyond that point are narrower and of higher specific gravity Further, the specific gravity of the outer rings decreases 10–15% between the base and about 5 m in height and at a slower rate to heights of 15 m or more. These factors all contribute to variability in strength. This variability has not been seriously taken into account in the manufacture of lumber products. Current sawmill procedures make no attempt to take advantage of these inherent differences in density. The general assumption appears to have been that this was a factor which was not subject to any control.

Solid sawn wide dimension lumber is not without its own significant drawbacks. In particular, inconsistency in dry dimensions and strength properties and poor availability of long lengths are major deficiencies. Variability in grain orientation and differences and changes in moisture content result in dimensional instability before and after installation. Inconsistent width from piece to piece results in poor conformation of sheathing or subfloor. In the case of subflooring this is a major contributor to the cause of annoying squeaks as people walk on the floor.

Many approaches have been taken to engineer structural grade wood products to take the place of the larger and/or longer lumber sizes now in short supply. One successful approach is based on adhesively bonding a number of plies of rotary cut veneer. Unlike typical plywood products, the grain direction of all the plies is normally in the same direction. In one way of producing this product wide panels of appropriate thickness are ripped into pieces of standard dimension lumber width then finger jointed to the desired length. Other processes start with relatively narrower veneer sheets which can be butted end-to-end and continuously bonded to make units of almost any desired length, width, and thickness. The butt joints of adjoining plies are preferably staggered to prevent introducing points of weakness. This so-called laminated veneer lumber (LVL) has been in commercial production and use for a number of years, often as the tension members of trusses; e.g., as seen in Troutner, U.S. Pat. No. 3,813,842. It has the advantage that defects, particularly knots, do not run entirely through the piece as they do in sawn wood. This generally allows a higher stress rating for a LVL member of any given cross sectional dimensions. However, LVL initially requires very high grade "peeler" logs and high adhesive usage, both of which have an adverse effect on cost. Other exemplary products of this type are described by Peter Koch, Beams from bolt-wood: a feasibility study, *Forest Products Journal,* 14: 497–500 (1964) and by E. L. Schaffer et al., Feasibility of producing a high yield laminated structural product, U.S.D.A. Forest Research Paper FPL 175 (1972).

Many combinations of veneer, solid sawn wood, and reconstituted wood such as engineered strandboard or flakeboard have also been explored for use as structural lumber products. Lambuth, in U.S. Pat. No. 4,355,754, shows a structural member in the form of an I-beam using a plywood web with solid sawn flange members. When used as a joist, this is presumably substitutable for sawn lumber of the same cross sectional dimensions. The web is friction fit and glued into tapered slots in the flange pieces. Other very similar constructions use composite wood strips such as oriented strandboard or flakeboard as the web member.

Barnes, in U.S. Pat. No. 5,096,765, notes the importance of stiffness (modulus of elasticity in flexure) (MOE) in lumber products. The product described uses splinters or strands of sliced veneer from 0.005–0.1 inch (0.13–2.5 mm) thick, at least 0.25 inches (6.4 mm) wide and at least 8 inches (203 mm) long. These must be free of any surface or internal damage and have their grain direction within 10° of the longitudinal axis of the product. After addition of adhesive the product is pressed to have "an MOE equivalent to a composite wood product having a MOE of at least 2.3 mm psi [$1.59\times10^7$ kpa] at product (sic) a wood content density of 35 lbs/cubic foot".

In the above patent the inventor refers to his earlier U.S. Pat. No. 4,061,819 which teaches that the strength of wood composite products is density dependent; i.e., ". . . the higher [the] density generally the higher the strength of the product for the same starting materials". The earlier patent describes a very similar lumber-like product to the above having a modulus of elasticity approaching or reaching the MOE of clear Douglas-fir at various densities. Products similar to those described in the Barnes patents are now commercially available. However, the very high adhesive usage they require has a significant negative impact on cost of the products. Also, the strandwood products have significantly higher density than sawn lumber and are heavier to handle and more expensive to ship.

Many other patents teach the manufacture of clear wood members by various combinations of sawing and edge, end, and/or face gluing. Exemplary of these are U.S. Pat. No. 1,594,889 to Loetscher, U.S. Pat. No. 1,638,262 to Neumann, U.S. Pat. No. 2,942,635 to Horne, U.S. Pat. No. 5,034,259 to Barker, and U.S. Pat. No. 5,050,653 to Brown. Other workers have explored surface densification for various purposes, Exemplary of these are U.S. Pat. No. 3,591,448 to Elmendorf and U.S. Pat. No. 4,355,754 to Lund et al. Most of the products noted above have not found significant success for one or more reasons. There are exceptions, however. Laminated veneer lumber and edge and end glued pieces reassembled to produce clear boards or for use as door cores have been in commercial use for many years. Composite I-beams similar to those described in the Lambuth patent are now also widely available. One such product family manufactured by Trus Joist MacMillan, Boise, Id., is typical of the products which appear to have become an industry standard.

The composite I-beams have found considerable acceptance in the building industry where long spans, consistent dimensions and known and dependable strength properties are required. However, they are not without their drawbacks. Their performance under common residential dynamic loads is not as good as solid sawn construction, due primarily to a lack of mass. As a result most builders use I-joists at a shorter than suggested span or at a reduced spacing. They cannot entirely be used as a replacement for sawn lumber. For example, they need reinforcing blocking to fill out the sides of the web to fill width at many loading points. Their cross section essentially prevents side nailing and they present a major problem in attaching other members to the sides. Also, since the flange portion of the I-joist provides almost all of the spacing and stiffness it cannot be notched as is commonly done with solid sawn lumber. The nature of the geometry increases shear forces in the web member to higher values than are found in solid products of rectangular cross section.

It is notable in view of the highly heterogeneous nature of the smaller trees now available that the art has not more seriously heretofore addressed the problem of producing strong wide and/or long members of uniform and dependable properties from smaller plantation trees. The present invention overcomes the noted deficiencies in solid sawn lumber and composite I-beams. In addition, it results in a much higher utilization of the tree into useful lumber products.

SUMMARY OF THE INVENTION

The present invention is directed to engineered structural wood products. These products are especially useful in critical applications such as joists, headers, and beams where longer lengths, greater widths, and predictable and higher stress ratings in edge loading may be required. The products have the advantage that they may be handled in the same fashion as solid sawn lumber. They possess all of the attributes of composite I-beams and solid sawn lumber without the negative aspects. Strength properties are predictable and uniform. The products do not have the strength variability between and within individual pieces found in much visually graded solid sawn lumber, particularly that produced from younger trees. Improved dimensional stability is achieved through product design and randomization of natural wood grain. Edges are free from wane. The design also minimizes the effect of natural defects such as knots. Better end use performance under dynamic load is achieved through an optimal combination of mass and stiffness. The products can be made, in a large variety of standard and non-standard sizes with predictable performance that can be specifically tailored to a wide range of use requirements. The invention is also directed to a method for making the wood products. While it is not so limited, the invention is particularly directed to the manufacture of products having enhanced strength characteristics which are made from smaller logs such as thinnings and plantation grown trees. The plantation grown southern pines will be frequently cited as examples. However, it should be emphasized that the invention is applicable to all species regardless of the forest locale in which they were grown.

Very simply stated, the present invention takes the strongest wood from the tree and selectively places it in the product where it will make the maximum contribution to stiffness and bending strength.

As was noted earlier, up to a certain age the, density of trees increases radially from the pith toward the bark surface. Modulus of elasticity, an indicator of stiffness, increases similarly since it is related directly to density. Where the terms "modulus", "modulus of elasticity" or "MOE" are used hereafter they will refer to modulus of elasticity measured in flexure with the member loaded on edge. Logs from these radially anisotropic trees are machined in a manner so that the relatively higher density portions can be segregated from the relatively lower density portions. These higher density portions are then placed in the final product in locations where they will make the maximum contribution to strength and stiffness.

The products of the invention are composites in that a first component is formed from the relatively lower density wood and a second component is similarly formed from the relatively higher density wood. Both components will ultimately be of generally rectangular cross section. The components are then recombined so that strips of the relatively higher density second components are adhesively bonded to one, or more usually to both, opposing edges of the relatively lower density first component. Thus, the ultimate product will comprise at least two, and more commonly at least three, individual pieces glued together in the fashion noted. In effect the member can be considered as analogous to a beam, such as an H, I or T-section beam, in which the relatively lower density first component serves as the web portion while the relatively higher density second component strips act as flange members.

The wood strips forming the second or relatively higher density component should have a modulus of elasticity of at least about $9.6\times10^6$ kPa ($1.4\times10^6$ psi) and preferably at least about $1.0\times10^7$ kPa ($1.5\times10^6$ psi). Even higher stiffness values are preferred where appropriate wood is available and for special applications.

The breakdown of the logs can be by conventional sawing, by forming rotary cut veneer, by forming sliced veneer, or by some combination of these methods. One method of production is to first saw the logs into boards or cants and then resaw these into strips of appropriate width and thickness. The relatively higher density wood from nearer the bark surface is selected and segregated from the relatively lower density wood nearer the heart of the tree. Another method is to peel the logs into rotary cut veneer, such as might be used for the manufacture of ply wood. The first peeled veneer that comes from the outer higher density portion of the log is set aside for remanufacture into the second component portion of the product. The veneer can be trimmed to desired widths and laminated into first and second components of any desired thickness. Sliced veneer can be used in similar fashion. In particular, apparatus for making thick veneer slices of at least about 13 mm (0.5 in) in thickness, is now commercially available and will produce a particularly advantageous product for further remanufacture.

Sliced veneer has the added advantage in that it is relatively easy for an operator to visually determine the position in the log from which the slices were cut. This simplifies selection of the outer and inner log portions and enables their ready segregation.

It is most desirable in the case of the relatively higher density second component strips made from sawn wood and sliced veneer that they should be cut or trimmed with their longitudinal axis as nearly as possible parallel to the bark surface of the tree. This avoids the weakness introduced by "cross grained" wood; i.e., wood strips with the fiber not aligned generally parallel to the longitudinal axis of the piece. Most logs from which the strips will be sawn or sliced will have some taper. Rather than square up the strips by removing trim from the wood surface adjacent the bark any trim necessary to remove taper is instead taken from the weaker interior wood. Major defects, such as knots that would reduce strength, can be easily removed from the second component strips.

Either veneers or solid sawn components can be reassembled in a number of ways to make the products of the invention. For example, the relatively higher density second components could be either single or multiple strips of solid sawn wood or could be made from laminated veneers. If made from multiple laminae they could be oriented so that the plane of the laminae is either parallel to or at right angles to the longer cross sectional dimension of the rectangular first component. In similar fashion, the relatively lower density first component can be formed from a single sawn member or multiple pieces of sawn wood or veneers which are adhesively bonded. It will be understood that in the manufacturing environment it is inevitable that some of the higher modulus wood will be present in the first component. This is in no way detrimental but helps to further increase the stiffness of the product.

When multiple laminae are used for the first relatively lower density component it is preferable that at least the outer laminae have their grain running in the longitudinal direction. Any inner laminae can be similarly oriented. Alternatively, at least one inner lamina may have the grain oriented from 0° to 90° to the longitudinal direction. While there is some small loss in stiffness of the product, there is a significant advantage gained in dimensional stability if at least three laminae are used and an interior lamina is oriented about 90° to the outer laminae. Normally the construction of the first component would be balanced; i.e., if three laminae are used the interior lamina could have either longitudinal orientation or an orientation from 0° to 90° to longitudinal. If four laminae were used both interior laminae would normally have similar orientation. However, in this case, if the interior orientation was other than 0° or 90° it is understood that one of the interior laminae could have a positive orientation and the other a similar negative orientation. As an example of this, both interior lamina could have a 45° grain orientation relative to the longitudinal axis but they might have a 90° orientation to each other.

It is further within the scope of the invention to make longer products by placing the various individual components end to end. They might be simply abutted but are preferably joined using a scarf or finger joint. Either component could be formed from multiple random width strips that are bonded face to face only, or from strips bonded face to face and edge to edge. Both of these cases could be with or without adhesively bonded end joints. Most preferably, all adjoining surfaces are adhesively bonded. As is the standard practice with LVL it is desirable that overlying joints should be significantly displaced from each other to avoid introduction of points of weakness. While this is not a hard and fast rule, joints are normally displaced at least about ten times the thickness of the laminae.

The second components forming the edge portions of the product should normally constitute a minimum of about 19%, preferably about 25%, and up to about 32% of the total volume (stated otherwise, the cross sectional area) of the piece. In most cases this would be distributed essentially equally between the two second component pieces. However, a balanced construction is not essential in the case of the second components. As one example, it might be desirable to add more strength to the second component on the edge to be subjected to tension in use.

Another advantageous feature of the structural composite lumber of the present invention is its reduced cost of manufacture in comparison with LVL or strand-wood products.

It is an object of the invention to provide engineered structural wood products which can be made available in wide widths and long lengths and which have predictable and higher stress ratings than many solid sawn lumber products otherwise manufactured from the same material.

It is another object to provide a strong structural wood product made from smaller plantation grown trees and forest thinnings.

It is an additional object to provide a structural wood product that has rduced variability in both dimensional and structural properties within and between individual pieces.

It is a further object to provide structural wood products that can be used and handled in identical fashion to solid sawn lumber.

It is still an object to provide a method whereby a greater percentage of the tree volume is converted into high grade lumber It is also an object to provide methods for manufacture of the structural wood products of the invention.

These and many other objects will become immediately apparent to those skilled in the art upon reading the following detailed description taken in conjunction with the drawings.

BRIEF DESCRIPTION OF THE DRAWINGS

FIGS. 7–20 are perspective representation,. of various product configurations of the present invention.

DESCRIPTION OF THE PREFERRED EMBODIMENTS

Figure 1:
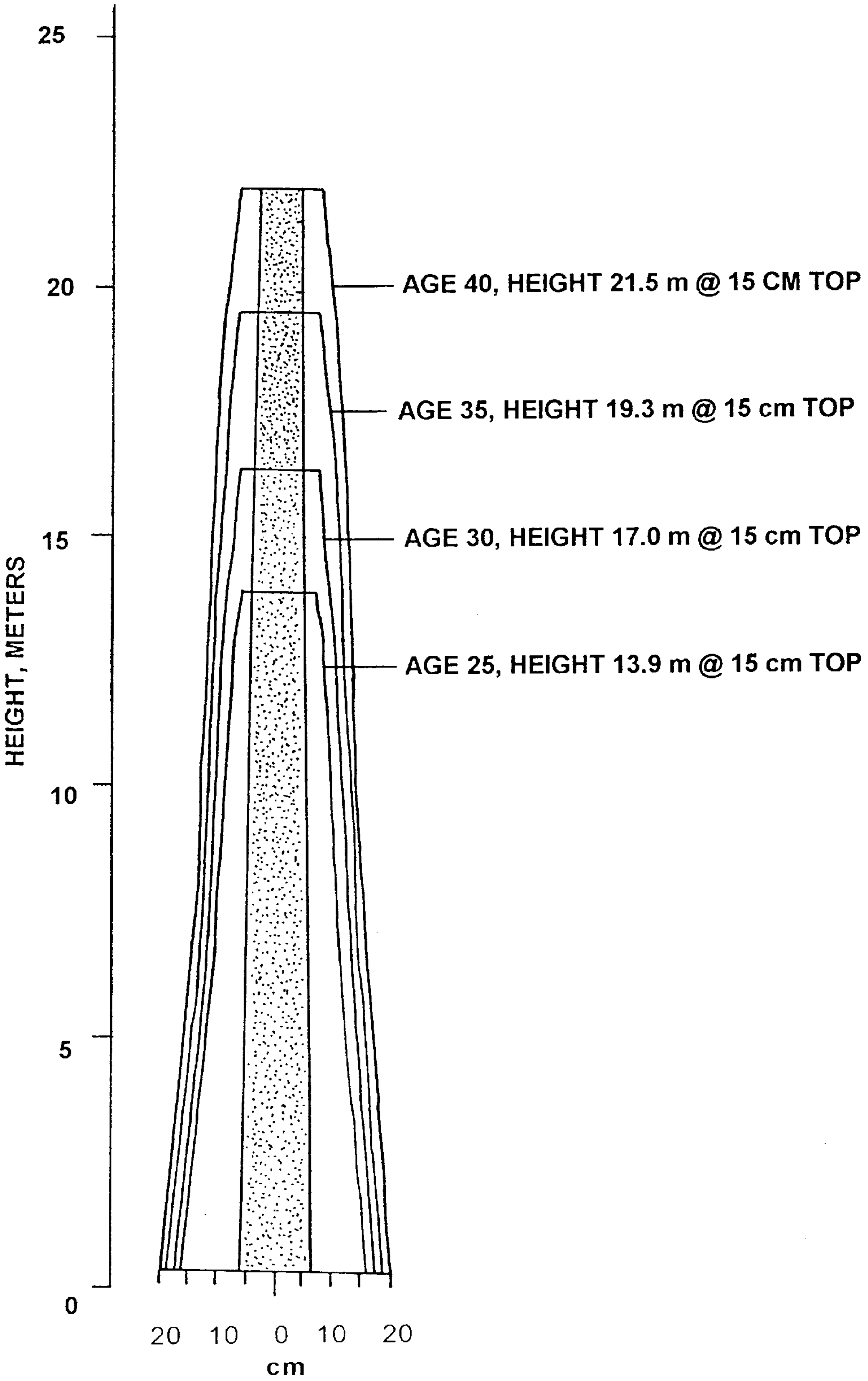
FIG. 1 is a representation of the sizes of typical southern pine plantation trees at ages 25, 30, 35, and 40 years.

FIG. 1 represents the portion of loblolly pine trees of four different ages generally useable as saw logs. The vertical lines represent the outer surface of the wood adjacent the bark and further show how the growth increments of a tree can be seen as a series of superposed hollow cones. The dimensions are averages for North Carolina plantation trees on good sites. These are typically initially stocked at about 990 trees per hectare (400 trees per acre) and thinned to about :500 trees per hectare (200 per acre) by 15 years age. The stands were fertilized three times during the growth cycle. The stippled area along the vertical axis shows the relatively lower density juvenile wood portion of the trees The following table indicates modulus of elasticity of clear wood at 12% moisture content for different locations in the lowest 10 m of a typical 35 year old loblolly pine plantation tree. Vertical increments are for 4 saw logs each 2.4 m (8 ft) long beginning at 0.6 m (2 ft) above the ground level to a height of 10 m (34 ft.). These four logs represent over 70% of the useable tree volume. For convenience of calculation it is assumed that the outer 5 cm (2 inches) along a given radius would be considered for the relatively higher density second component wood.

TABLE 1

| Height | MOE X $10^6$ kPa | | % of Tree Volume | |
|---|---|---|---|---|
| Increment, ft | Core | Outer 2 in | Core | Outer 2 in |
| 2–10 | 7.9 | 11.6 | 13.7 | 11.1 |
| 10–18 | 8.8 | 12.2 | 8.9 | 9.8 |
| 18–26 | 8.6 | 12.0 | 5.5 | 9.0 |
| 26–34 | 5.6 | 11.4 | 4.5 | 8.2 |

It can be seen from the above data that a more than adequate volume of the outer wood of sufficiently high MOE is available for manufacture and use as the second component of the products. This is approximately 28% of the total volume of the tree. The core wood of the tree at any height fails to reach the minimum MOE of $9.6\times10^6$ kPa ($1.4\times10^6$ psi) required for manufacture of the second component. However, by employing the methods of the present invention much of this lower modulus wood, comprising almost 70% of the tree, can be upgraded to meet the stress requirements of demanding applications by being used as core material.

Figure 2:
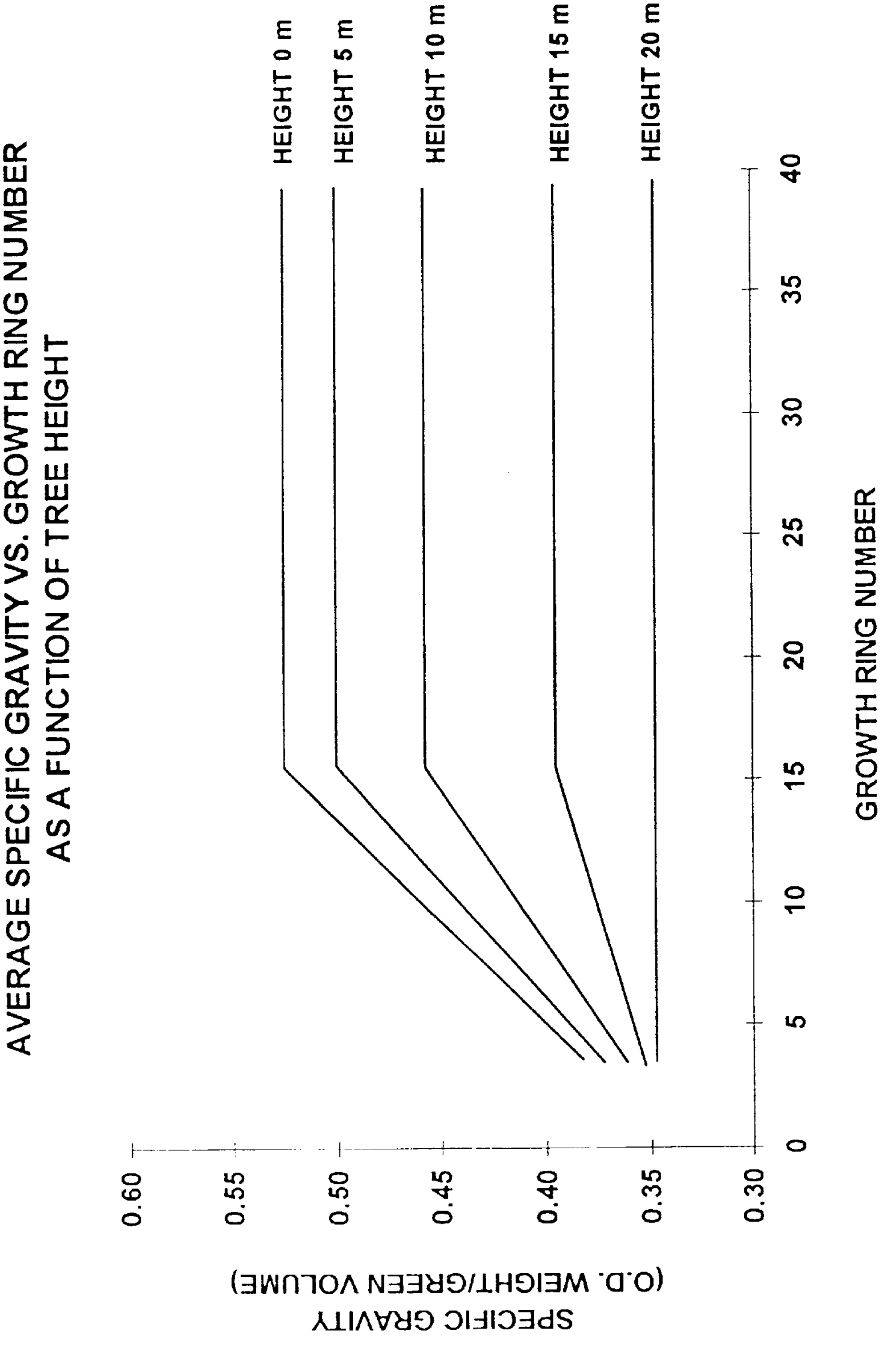
FIG. 2 is an idealized graph showing specific gravity vs. growth ring number as a function of tree height.

FIG. 2 is an idealized graphical representation of another data set for North Carolina loblolly pine showing average specific gravity at various tree locations and various growth ring numbers. These data were drawn from a sample of 35 trees from a 43 year old plantation pine stand. With only one exception among the samples taken, the wood laid down after age 15 had an average specific gravity greater than 0.4. The exception was the low density population at and above 15 m in height and both populations at 20 m. This data set shows well the approximately linear increase in density up to about age 15 and the marked leveling off beyond that age.

Figure 3:
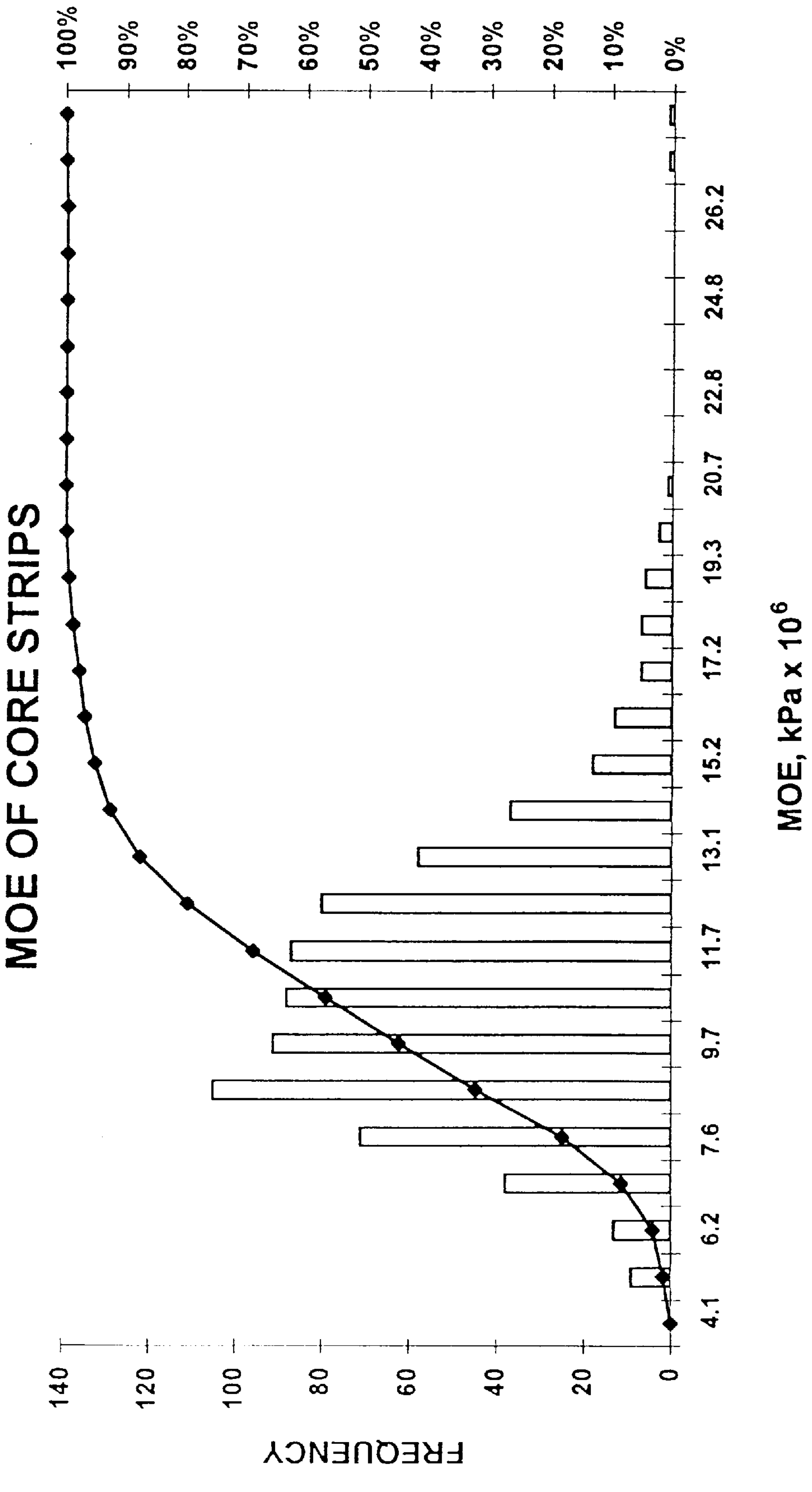
FIG. 3 is a graph showing modulus of elasticity of the inner wood in a sample of 80 southern pine trees.

FIG. 3 is a graph showing MOE of a large sample of mill run North Carolina pine strips cut predominantly from the core portion of the tree. The median MOE value is about $9.7\times10^6$ kPa ($1.4\times10^6$ psi). While this is higher than might be anticipated from the above table it must be remembered that the term "core" is not strictly limited to that portion having only 15 growth rings or less. The relatively low stiffness of much of this material is immediately apparent.

Figure 4:
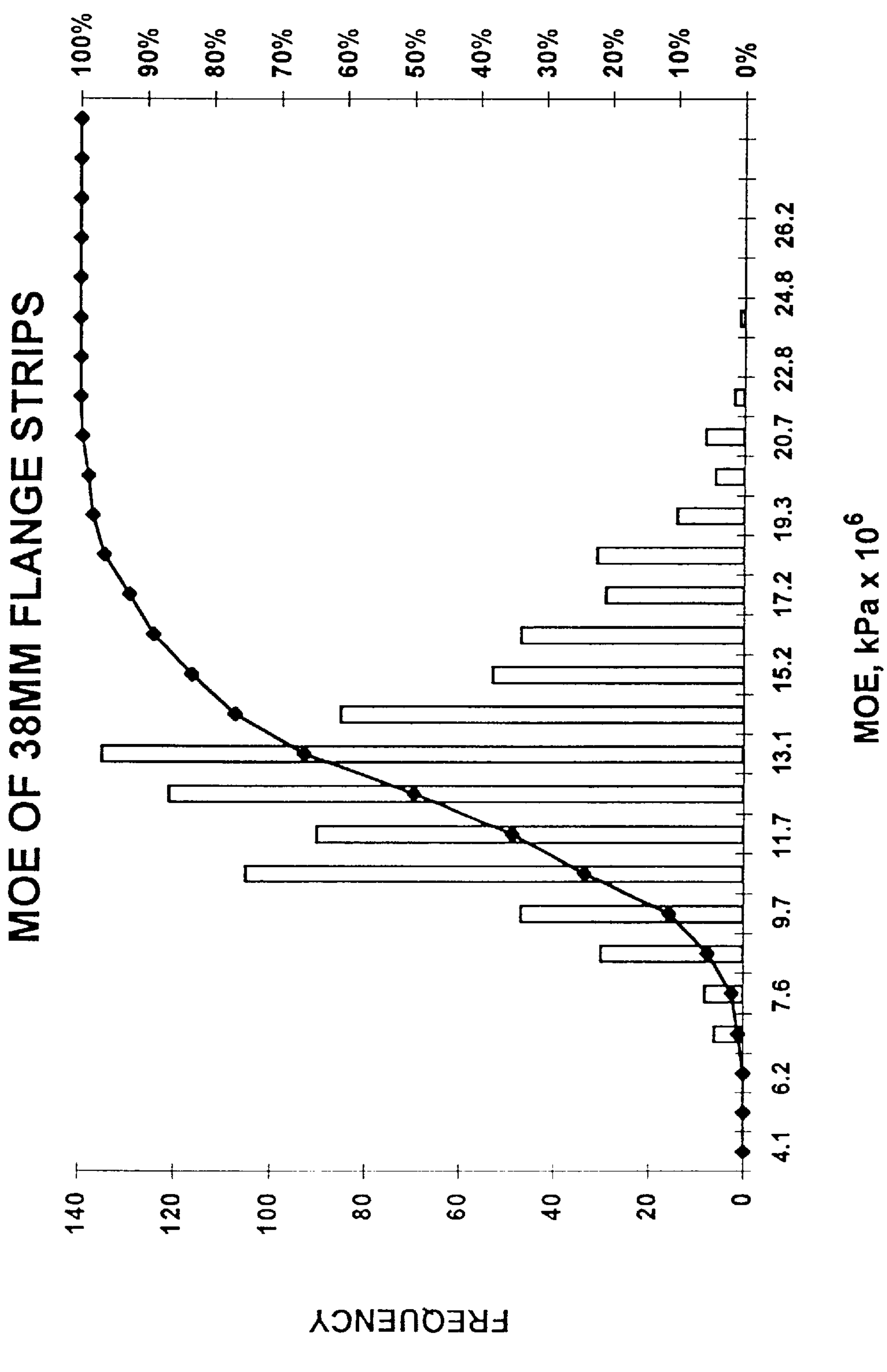
FIG. 4 is a similar graph for the outer wood of a sample of 154 southern pine trees.

FIG. 4 is a similar graph for a large sample of 38 mm (1½ in) wide strips taken from the outside portion of the logs. These were chosen as being suitable for the second product component. MOE of about 94% of these strips exceeded $9.7\times10^7$ kPa ($1.4\times10^6$ psi). The median MOE of the sample was about $1.2\times10^7$ kPa ($1.8\times10^6$ psi).

Figure 5:
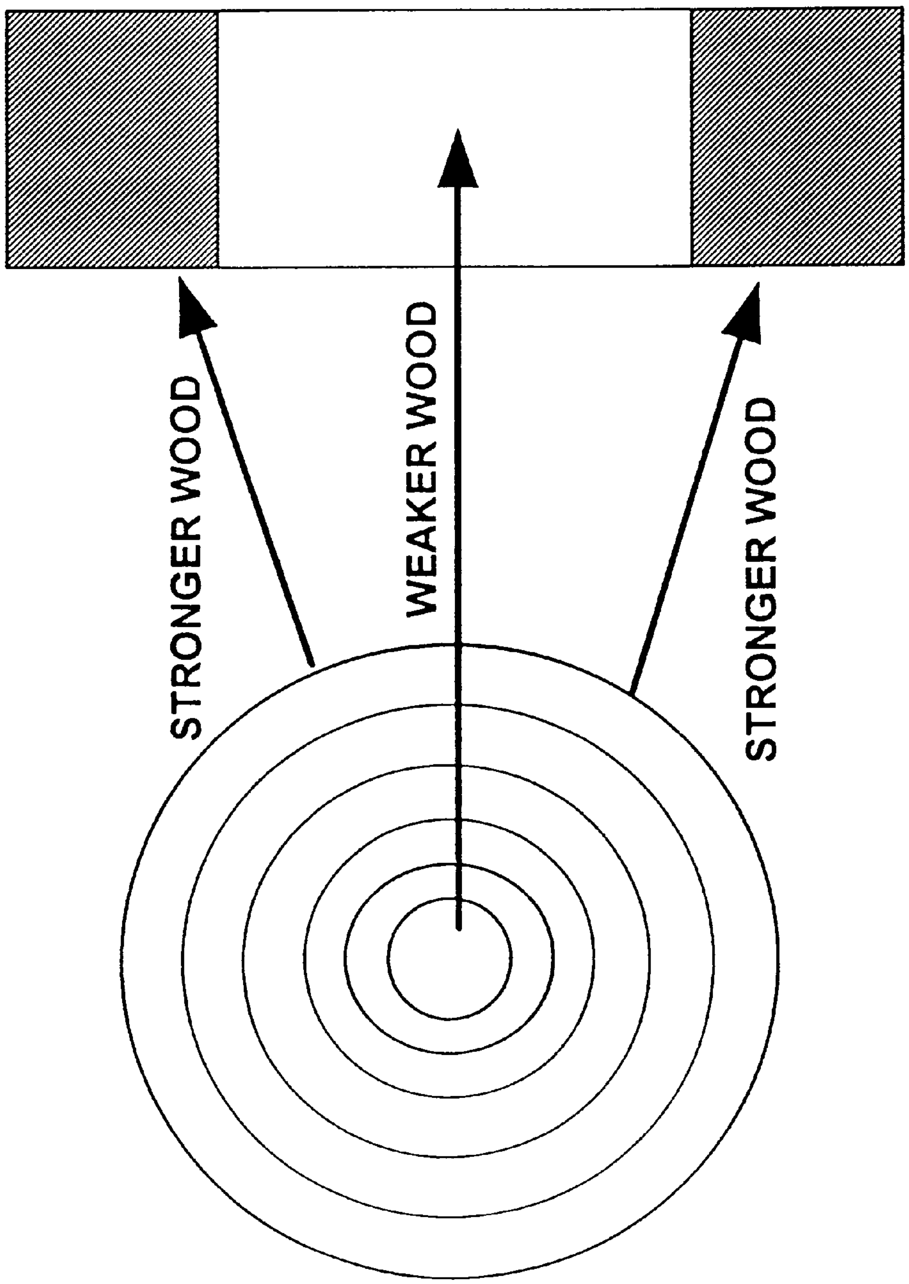
FIG. 5 is a depiction of the placement of the wood from various locations in the tree to its position in the structural wood product.

FIG. 5 is a diagram showing how the weaker interior portions of the logs and the stronger portion near the surface are located respectively as the first and second components of the products of the invention. The relatively weaker inner wood serves as the equivalent of the web member of a beam, primarily resisting shear forces in bending, while the relatively stronger wood acts as the flange members to resist tensile and compressive forces.

Figure 6:
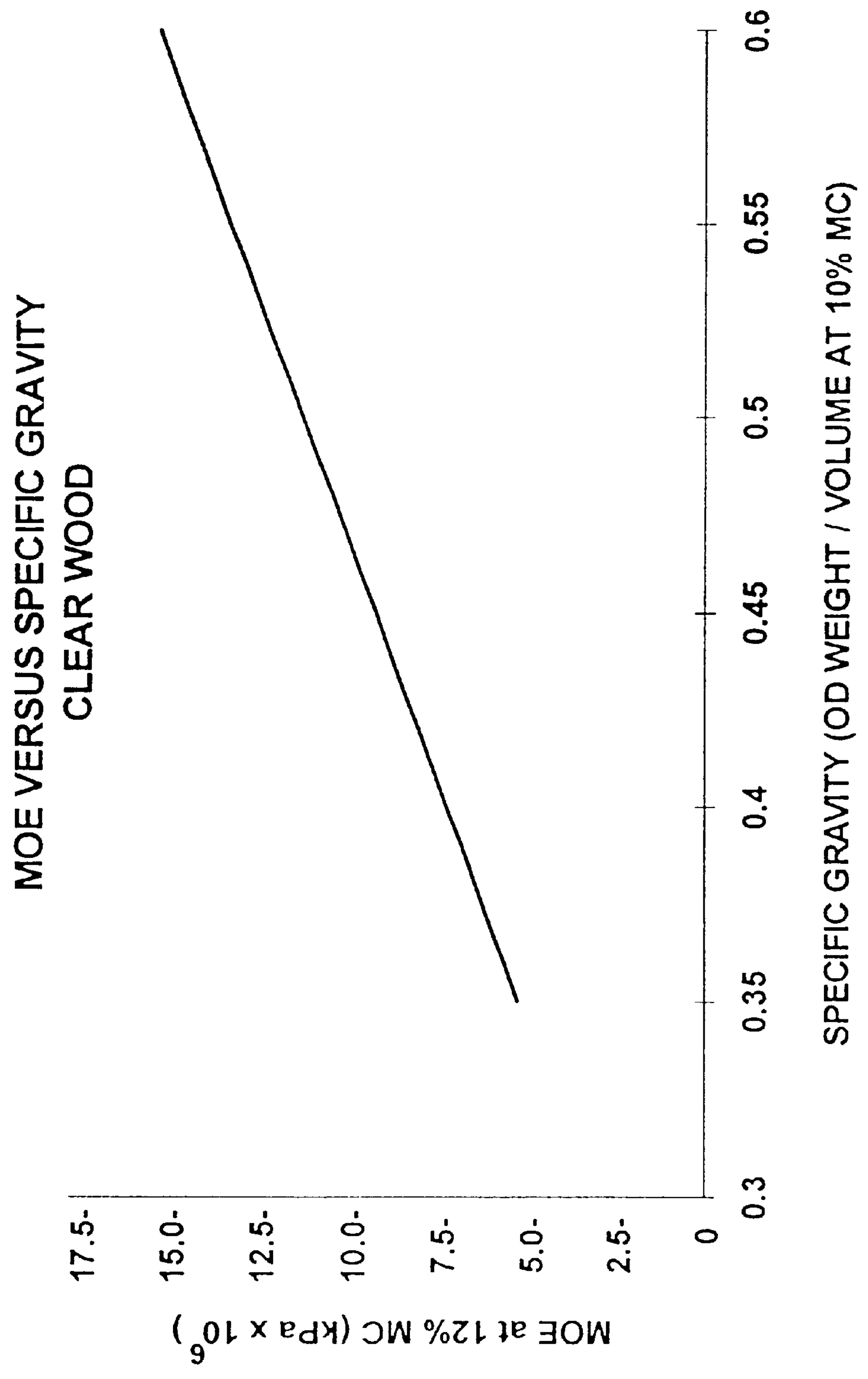
FIG. 6 is a graph showing a regression analysis generated relationship of wood specific gravity to modulus of elasticity.

A correlation between specific gravity and modulus of elasticity for clear loblolly pine is graphed in FIG. 6. It is seen that for loblolly pine a specific gravity of approximately 0.47 is required for a minimum MOE of $9.6\times10^6$ kPa ($1.4\times10^6$ psi). This correlation should be regarded as a general guideline since it will vary somewhat from stand to stand and species to species. The relationship is significantly influenced by genetic factors. However, the correlation shown can be considered as a general guideline.

Figure 7:
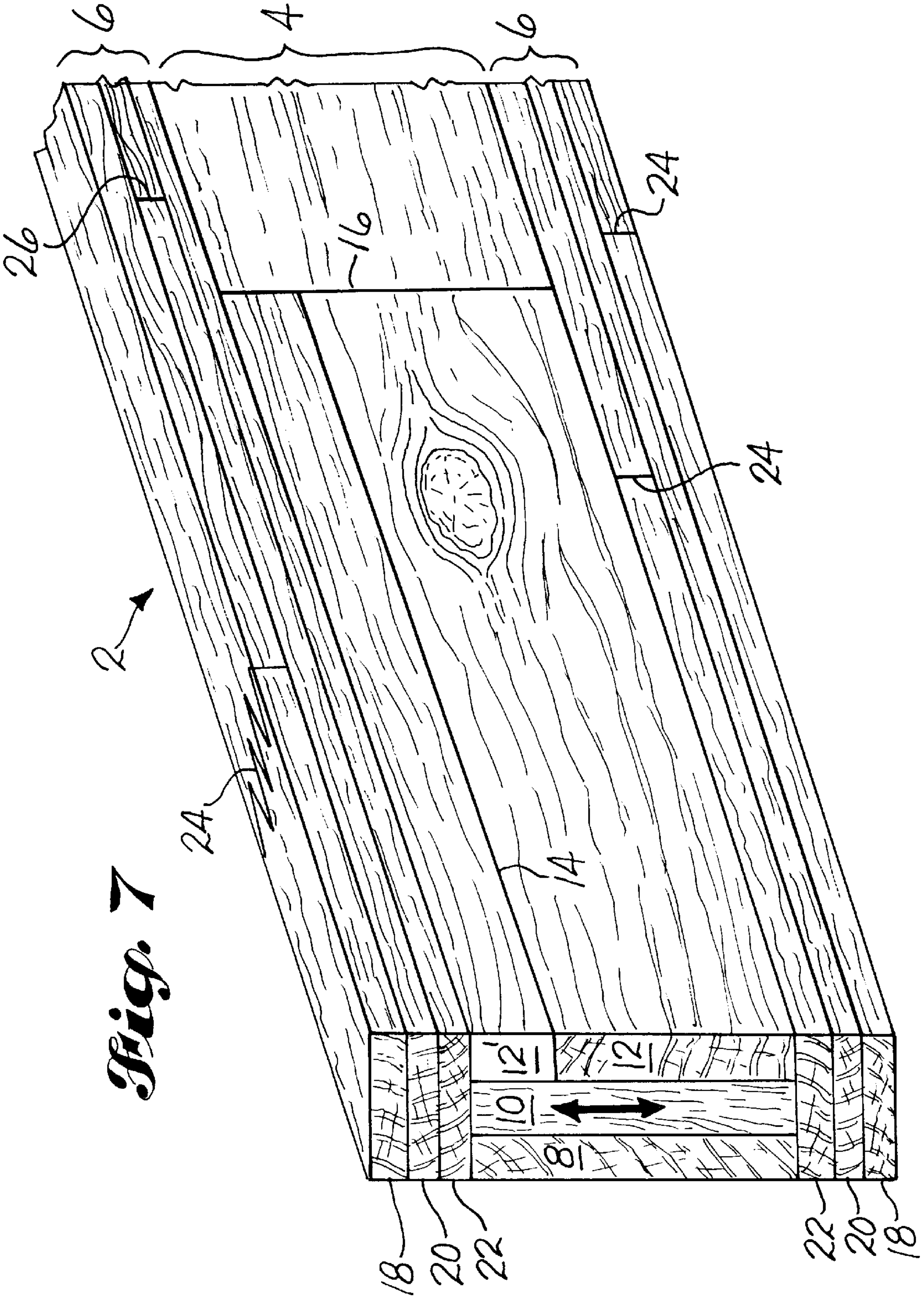

Emphasis will now be directed to specific constructions of the engineered structural wood products that have been found to be useful and advantageous. A great deal of variation in the construction is permissible within the limitation that the stronger relatively higher density wood from the outer portion of the tree is placed on opposing edges of the product. One such product is shown in FIG. 7. A product 2 resembling and useable in the same fashion as solid sawn lumber is constructed with a core or web first component 4 and edge or flange second components 6. In this particular construction the first or core component is made from three laminae 8, 10, and 12, 12'. The laminae can be sawn but are preferably made from thick sliced veneer. Equipment for preparing the thick sliced veneer is available from a number of suppliers; e.g., LINCK Holzverabeitungstechnik, Gmbh., Oberkirch, Germany. Veneer with a thickness greater than about 6 mm (¼ inch) is normally considered to be "thick sliced".

In the product of FIG. 7 the outer core laminae 8, 12 have the grain direction oriented longitudinally while the middle lamina 10 has the grain direction oriented vertically; i.e. about 90° to the longitudinal axis. As will be more fully explained later, this particular construction contributes significantly to dimensional stability of the product. The laminae may have edge joints 14 and end joints 16 as is necessary to supply strips of the proper length and width. While the simple butt joints shown at 16 are acceptable under many circumstances, finger joints should preferably be used for maximum strength.

It is essential that all face portions 8, 12, 12' be thoroughly adhesively bonded to any mid components 10. It is most highly desirable that they also be adhesively bonded at all edge joints 14. Unbonded butt joints 16 on the face members are allowable although finger or similar joints are normally preferred and will increase product bending strength. On the other hand, it is not critical that the transversely oriented mid components 10 be edge glued. Mid components 10 are usually formed by laying longer strips edge to edge and unitizing the resulting panels in a known manner; e.g., by one of the techniques commonly employed for unitizing core laminae in plywood. These are then sawn transversely to the proper length. Wane on the edges and small gaps between adjacent strips are permissible and have little effect on strength. Normally a highly weather resistant adhesive, such as one based on a phenol formaldehyde or phenol-resorcinol-formaldehyde condensation products, would be used. In addition to forming strong and durable bonds such adhesives have extremely low formaldehyde emission after curing.

As seen in FIG. 7 the second edge or flange components 6 in this particular example are also formed of three laminae 18, 20, and 22. These also may be formed of sawn or thick sliced veneers. Alternatively, both first and second components may be formed of multiple layers of rotary cut or peeled veneers. It is highly desirable that the strips forming the second components be glued at all contacting surfaces. End joints 24, 26 are preferably finger joints although long scarf joints may also be used in some cases. Where multiple laminae are used in the second component as shown at 18, 20, and 22 in FIG. 7 they may all be of similar stiffness or, in some instances, may be graded with the outer laminae 18 being of somewhat higher stiffness material.

FIGS. 8 to 11 show a number of construction variations of products using; e.g., thick sliced veneers for the first and second components. The construction of FIG. 8 is identical to that of FIG. 7 but is included again for ready side-by-side comparison. Like components are given like reference numbers throughout.

The product 34 of FIG. 9 is different from that of FIGS. 7 and 8 only in that the interior lamina 30 in the first component core portion is oriented with the grain direction longitudinal. Stiffness in bending of this product will be somewhat greater than that of FIGS. 7 or 8 but the possibility exists for somewhat greater shrinkage or expansion along the longer cross sectional dimension. The reasons for this are as follows. Longitudinal shrinkage of wood is low, varying from approximately 0.5% for the most juvenile wood to a more typical 0.3% to 0.1% for wood formed slightly later in the trees growth. In contrast, tangential shrinkage typically varies between about 6% to 8%, being slightly higher in wood of more mature characteristics. Radial shrinkage is approximately half of tangential shrinkage. By the use of multiple core member laminae the ultimate product shrinkage along the longer dimension can be significantly reduced and controlled. For example, the construction of FIGS. 7 and 8 uses a center lamina 10 with the grain direction oriented 90° to the longitudinal axis of the piece. This lamina will have very high dimensional stability along its longer cross sectional dimension. Thus, it will act to restrain shrinkage of the two outer laminae bonded to it. However, there will be a minor loss of about 7% to 9% in product stiffness. The decision can be made with regard to the intended use as to whether dimensional stability or stiffness should receive priority treatment In the products of FIGS. 7–9 the second component from the denser higher modulus wood is shown with the major planes of the laminae at right angles to the longer cross sectional dimension of the core first component. However, an equally suitable product can be made with the major planes parallel to the longer cross sectional dimension of the first component or core piece. Product 36 of FIG. 10 and product 38 of FIG. 11 have the second components formed of three laminae 40, 42, and 44. As before, the individual laminae can be joined end-to-end as is shown in finger joint 46 of FIG. 11.

Figure 12:
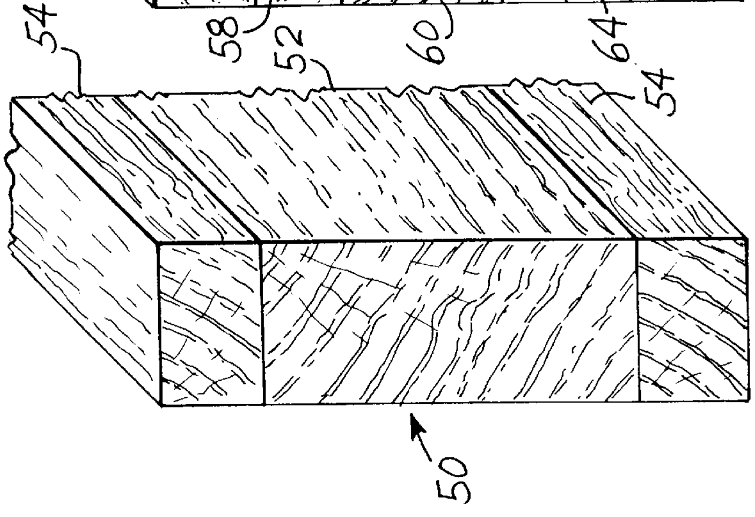

The invention should not be considered as limited to products made from multiple veneer laminae. FIGS. 12–15 show products made from solid sawn strips and from various combinations of solid sawn strips and veneer laminae. FIG. 12 shows a product 50 made from three pieces of solid sawn wood. The first component core piece 52 is cut from some interior portion of the tree where the density and modulus of elasticity may be relatively lower. Second component edge or flange pieces 54 are sawn from the higher modulus wood on the outer surface of the tree. FIG. 12 represents the simplest product construction of the present invention.

Figure 13:
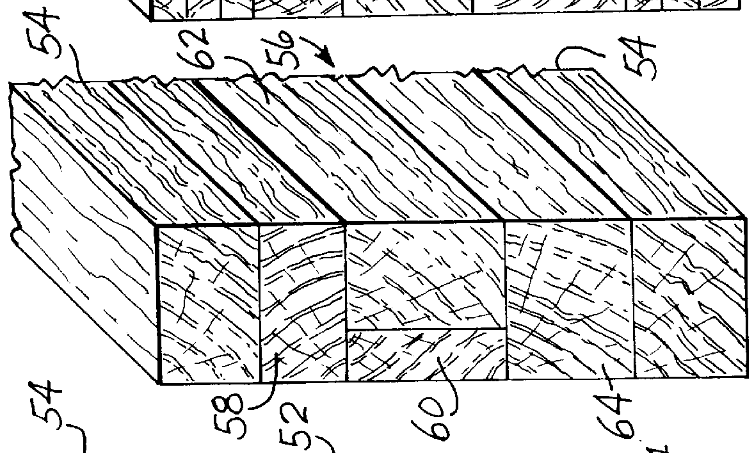

FIG. 13 is a product very similar to that of FIG. 12 except that the core is made of multiple pieces 58, 60, 62, and 64 adhesively bonded to each other. Technology to make an assembly of this type has existed for many years and, as one example, is used to make core material for solid core wood doors. It is an effective way to utilize shorter pieces of lumber that might otherwise be sent to some lower value use such as wood chips or fuel.

Figure 14:
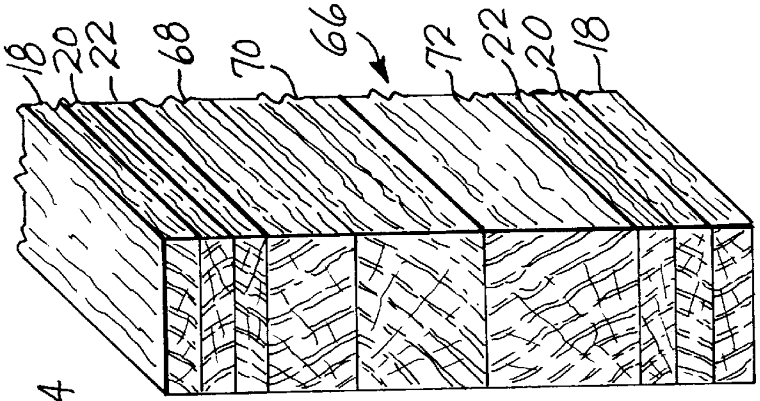
Figure 15:
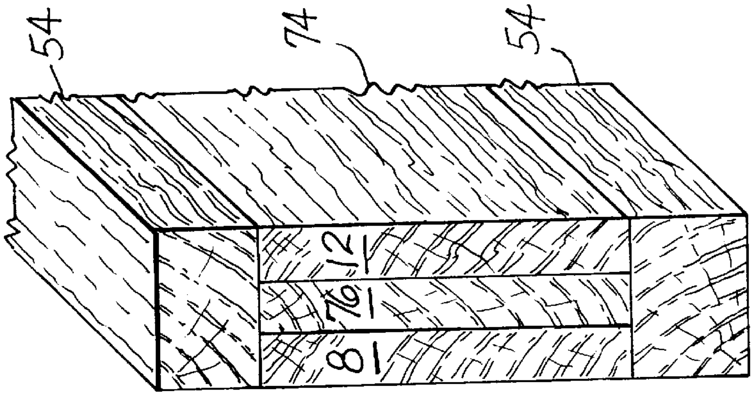

Hybrid constructions of sawn wood and veneer laminae are shown in FIGS. 14 and 15. Product 66 of FIG. 14 has a first component core made of solid sawn strips 68, 70, 72 adhesively bonded to each other and second component edge pieces made from veneer laminae 18, 20, and 22. FIG. 15 is similar except here the core piece is formed from laminae 8, 12, and 76 while the second component edge pieces 54 are solid sawn. It should be understood that the grain direction orientation of center lamina 76 in this and all of the other similar products can range from longitudinal to vertical. Otherwise stated, the grain direction of any interior laminae can be from 0° to 90° to the longitudinal dimension of the product.

Figure 16:
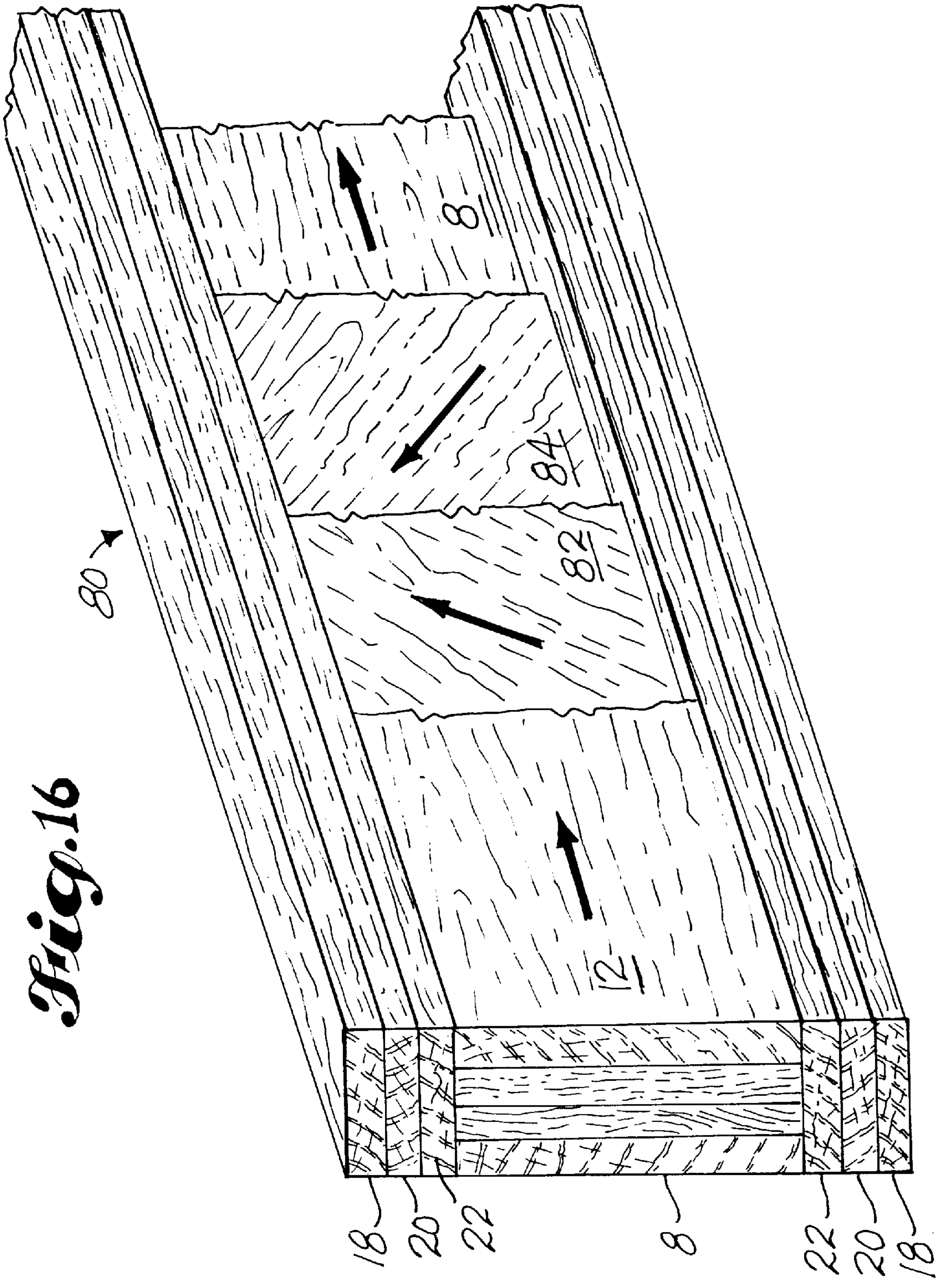

When veneer laminae are used for the first component core construction it is normally desirable that the construction should be balanced. It is presumed that the exterior or surface laminae will always have their grain direction longitudinal. In a three ply construction the interior lamina grain direction can be from 0° to 90° as just stated. However, to use the example of a four ply first component core, it would not be particularly desirable to have three of the laminae with the grain longitudinal and one lamina with the grain at some other orientation. One example of a four ply first component construction is seen in FIG. 16. Here the product 80 has the two interior laminae 82, 84 of the core first component oriented at an angle of 45° to the horizontal. It would be acceptable if the grain orientation of laminae 82 and 84 was in the same direction or it could be opposite as shown in the drawing; i.e., displaced by about 90°.

The second component comprising the two flange portions of the product should normally constitute in total at least 20% of the cross sectional area (or volume) of the product, preferably at least about 25%, in order, to achieve the stiffness required in critical structural uses. In a product having dimensions of 38×241 mm (1½×9½ in) the second or flange component will normally constitute about ⅓ of the cross sectional area (or volume) when the MOE of the wood in this portion is at least $1.0\times10^7$ kPa ($1.5\times10^6$ psi). For a deeper product having the dimensions of 38×302 mm (1½×11⅞ in) a flange volume of 25% is sufficient. Of course, if wood of significantly higher MOE is available second component volume can be decreased somewhat.

Figure 18:
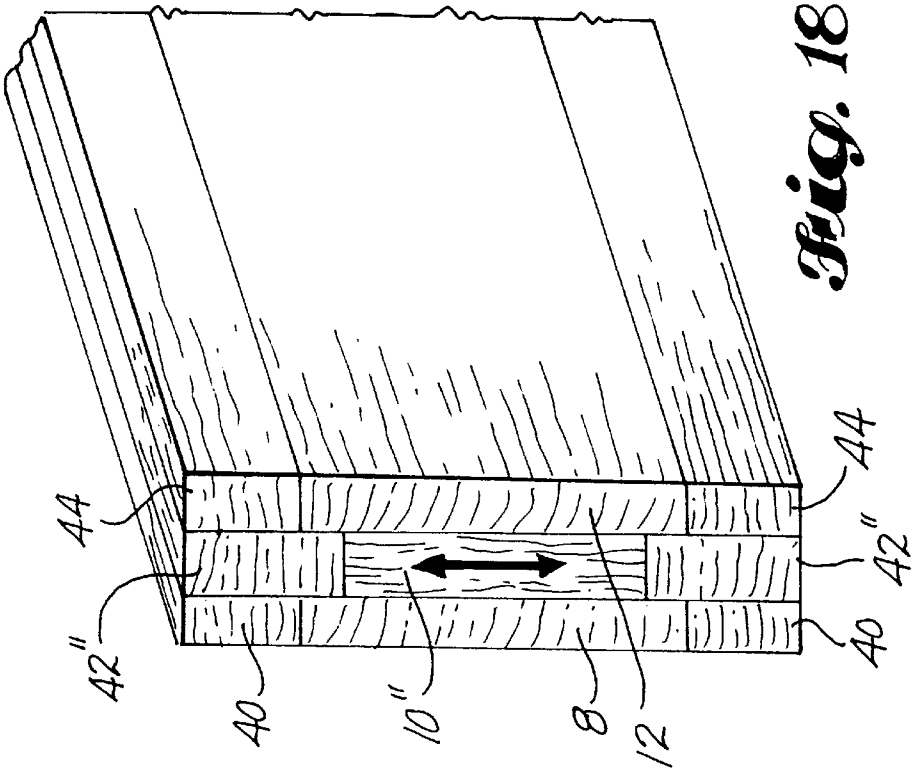
Figure 17:
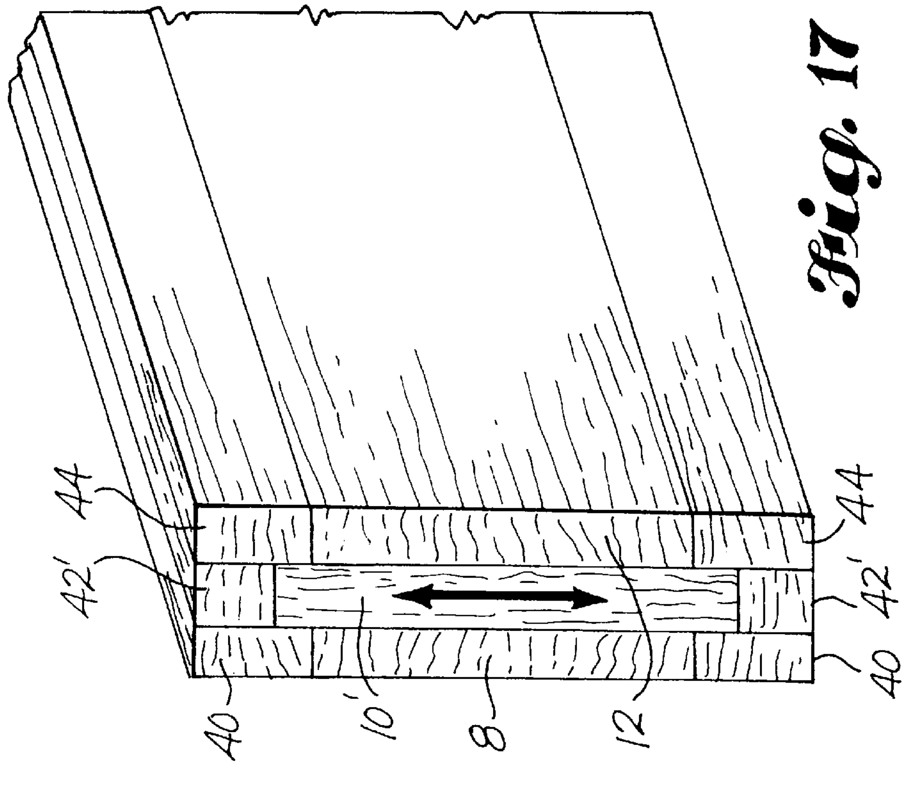

One variation that can be made in any of the constructions shown in FIGS. 7–11 as is shown in FIGS. 17 and 18. The central edge component laminae 42 can be shortened as at 42' and center component lamina 10 can be extended, as seen at 10' in FIG. 17, to form a spline-like member tying or keying the core component to the edge components. Alternatively, as seen in FIG. 18, center lamina 10 can be shortened as at 10" while edge component laminae 42 are extended as at 42" to form a similar but reversed direction spline.

Figure 19:
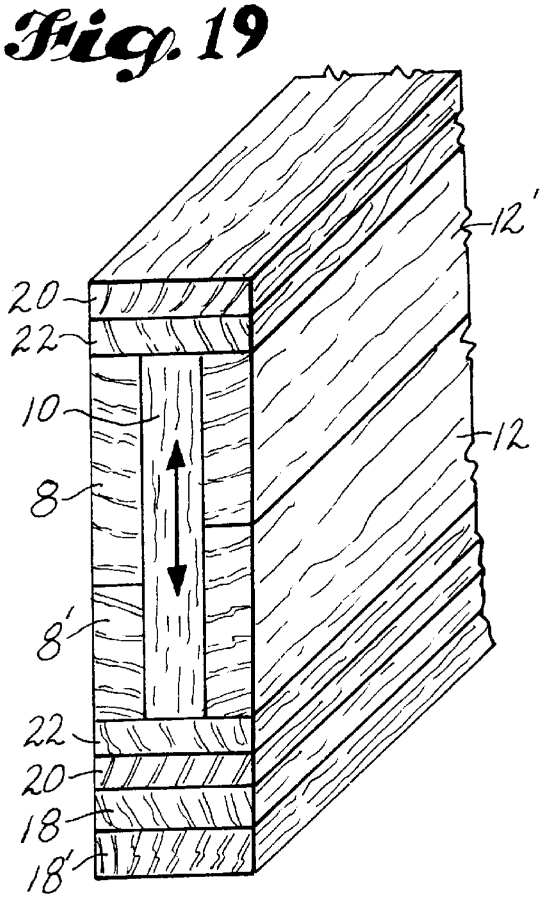
Figure 20:
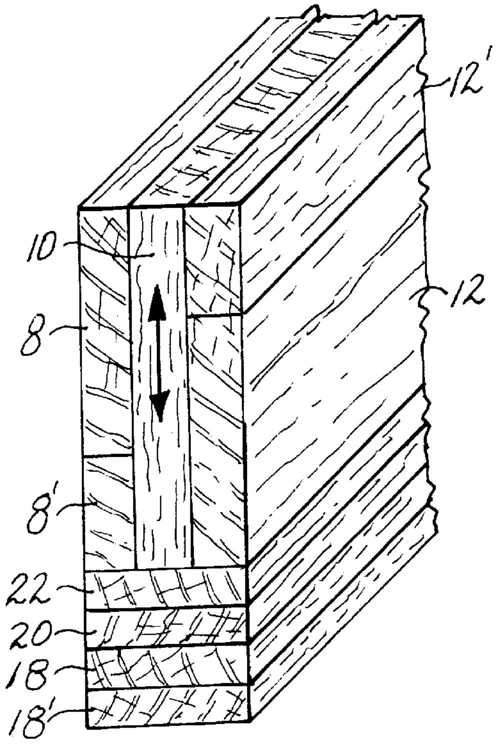

For some applications it is not essential for the second component flange areas to be of balanced construction. While for most uses they would be balanced to provide an analog to an I-beam, for others they might be unbalanced to simulate a T-section beam. Floor joists might be such an application. Here bonded panel subflooring could act as the upper or compression side of the member and the relatively higher density second component would serve as the lower or tension side. As is shown in FIGS. 19 and 20 the first component consists of three laminae 8, 8', 10, and 12, 12', inner lamina 10 being oriented 90° to the outer laminae. In FIG. 19 the second component has two upper laminae 20, 22 and four lower laminae 18, 18', 20 and 22. This construction puts more of the strong wood in an area that would normally be the tension side in use. Alternatively, in FIG. 20 the second component can be (completely omitted along the upper edge of the product. While the unbalanced constructions exemplified in FIGS. 19 and 20 might be considered exceptions they certainly should be considered to be within the scope of the invention.

A major application of the products of the invention is for use as headers over openings such as wide windows or doors; e.g., garage doors where long lengths are frequently required. This application is now largely filled by products such as solid sawn nominal “4×10 in” or “4×12 in” (102×254 mm or 102×305 mm) members when available, by glue laminated beams, or by other laminated or composite wood products such as LVL. Actual thickness of most headers in American and Canadian markets is typically 3½ inches (89 mm). Another application of major importance is for use as joists. The normal joist of solid sawn lumber has an actual thickness of about 1½ inches (38 mm) with widths of 7½, 9½, and 11¼ inches (191, 241 and 286 mm).

Figure 21:
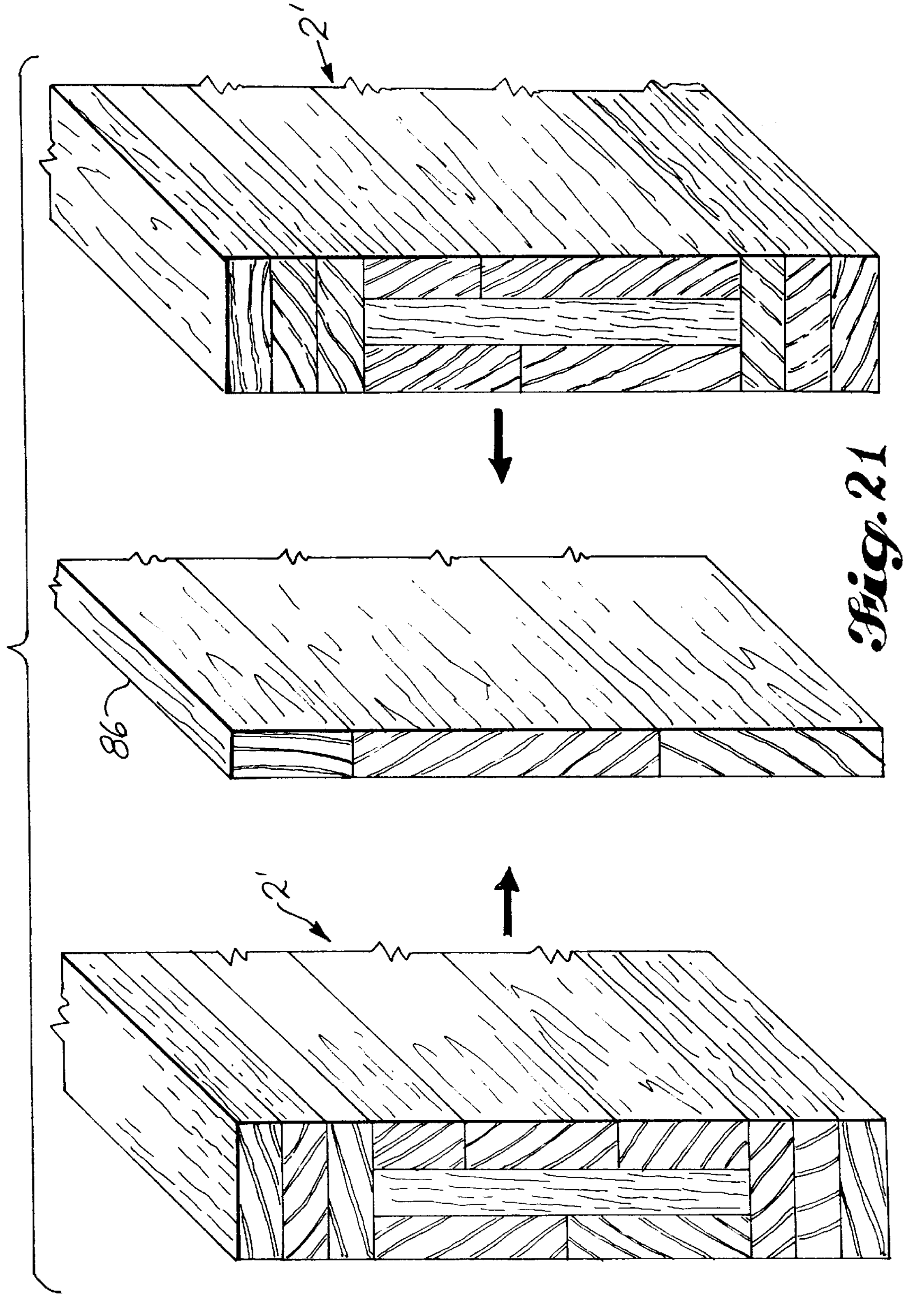
FIGS. 21 and 22 show ways in which the products of the invention can be used to create thick products for use as headers or for similar applications.
Figure 22:
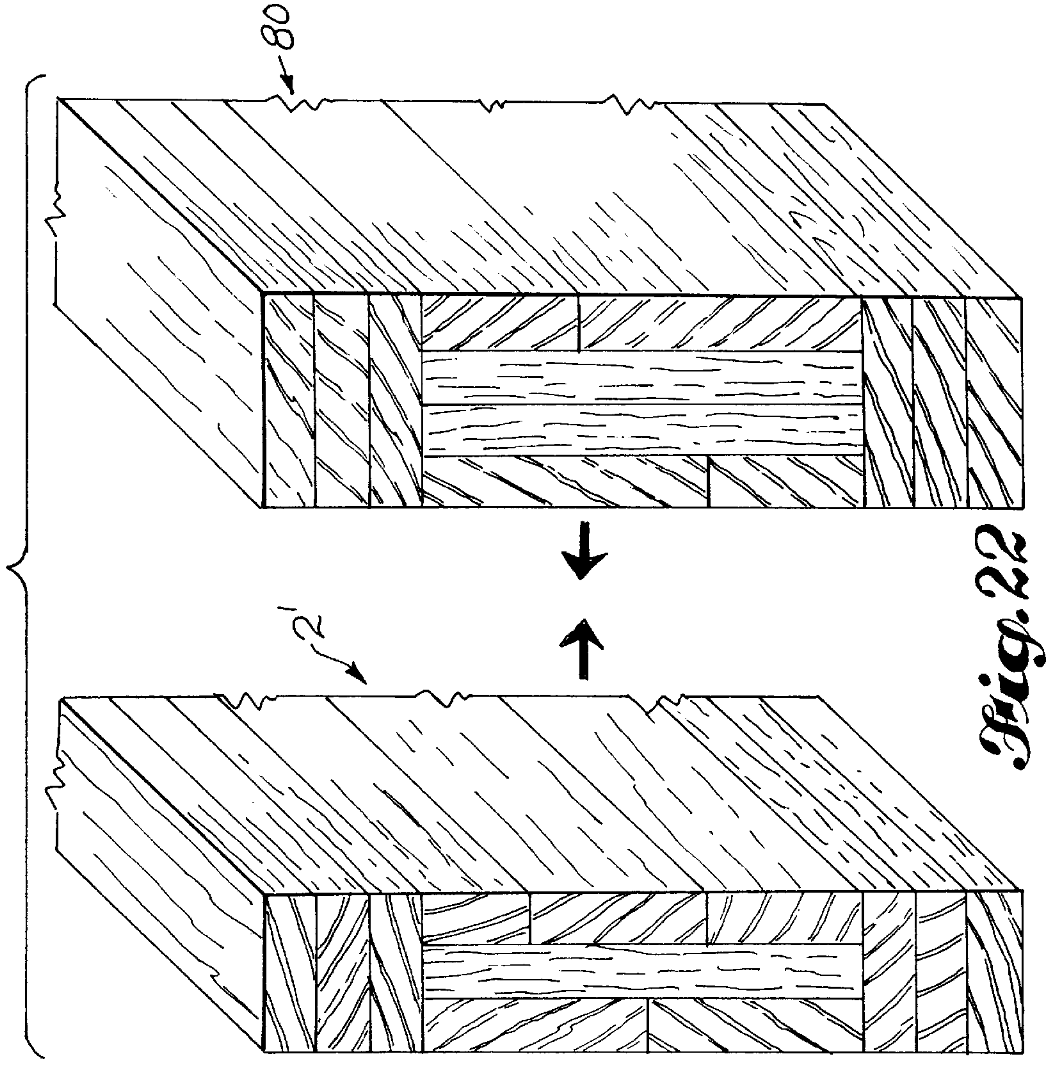

It is anticipated that most of the structural composite lumber products of the present invention would be made in similar sizes to that of nominal 2 inch thick (1½ inch actual thickness) solid sawn lumber. However, an apparent problem arises when it might be necessary to make products having a thickness of 3½ inches (89 mm) or larger from units having a thickness of only 1½ inches (38 mm). This problem can be addressed as is shown in FIGS. 21 and 22. In FIG. 21 two units 2'; e.g., such as those from any of the earlier figures, are laminated to a medial unit 86. For this example each strip is made from ½ inch (13 mm) strips as is the medial piece 86. Thus, each product 2' has a thickness of 1½ inch. The medial member can have either longitudinal grain orientation, such as element 30 of FIG. 9, or transverse grain orientation; (e.g., as shown by element 10 in FIG. 8, and is the full width of the product. Normally this product would be factory or mill produced. This produces a header of 3½ inch actual thickness having a balanced construction and directly substitutable for any of the aforenoted solid sawn or laminated products.

A second method of attacking the above problem is to form initial structural composite lumber products in varying thicknesses, for example 1½ and 2 inches. Then, as is shown in FIG. 22, pieces 2' and 80', one 1½ inches and the other 2 inches thick can be joined to form a header of the requisite 3½ inch thickness. The 2 inch thick members 80' can be produced and sold as a regular product available in any lumber yard. In this case field assembly by nailing or other means is a practical way of forming 3½ thick headers. Other thicknesses can be produced in a similar manner.

It should be emphasized that the above product dimensions are exemplary as are the specific assemblies of the individual laminae forming them. Individual flange and web strips may be sawn, sliced or peeled in varying thicknesses. Many variations would be expected and are permissible, depending on the needs of the actual consumer.

Figure 23:
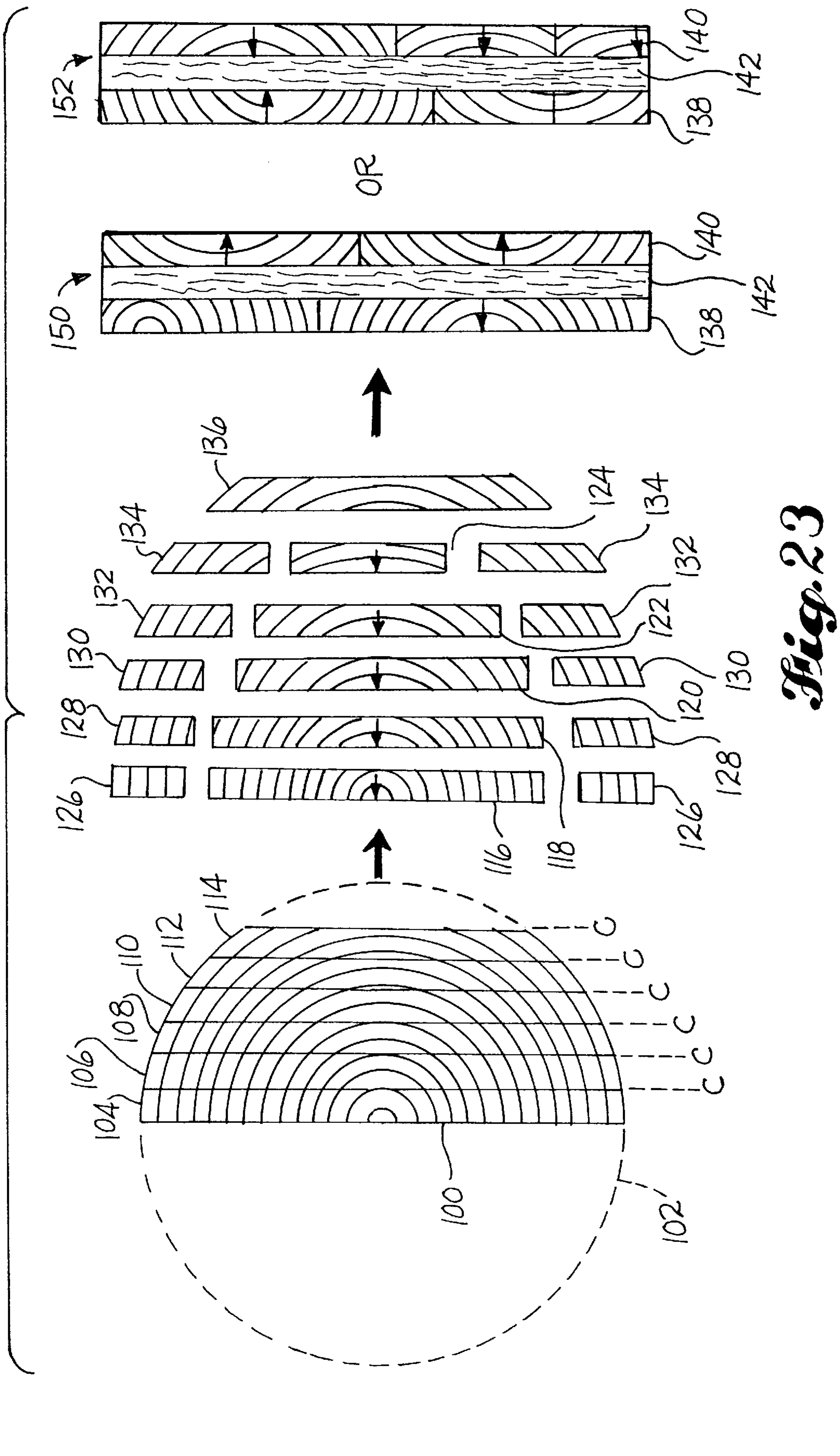
FIG. 23 shows a product construction having improved resistance to cupping.

One particular method of the core or web construction that gives additional dimensional stability is shown in FIG. 23. This is particularly useful in reducing any tendency toward cupping of the structural composite lumber product. A cant of flitch 100 is taken from a log 102. This is sawn or sliced along lines c into a number of strips 104, 106, 108, 110, 112, and 114. These are then trimmed to produce strips 116, 118, 120, 122, and 124 intended for use in core or web members and strips 126, 128, 130, 132, 134, and 136 from the outer part of the tree intended for use in the flange portion of the ultimate product. Pieces of the strips from the inner portion of the tree are edge and end joined as necessary and trimmed to appropriate width as outer core or web members 138, 140. They are then laminated with one or more medial strips 142 and assembled into a core member shown as 150 or, alternatively, 152. The small arrows at the center of each strip indicate direction toward the pith or center of the log. Outside members 138 and 140 of each core member are most preferably oriented so that the surfaces closest to the center of the log either face away from each other, as in product 150, or face toward each other, as in product 152, as shown by the arrows.

Figure 24:
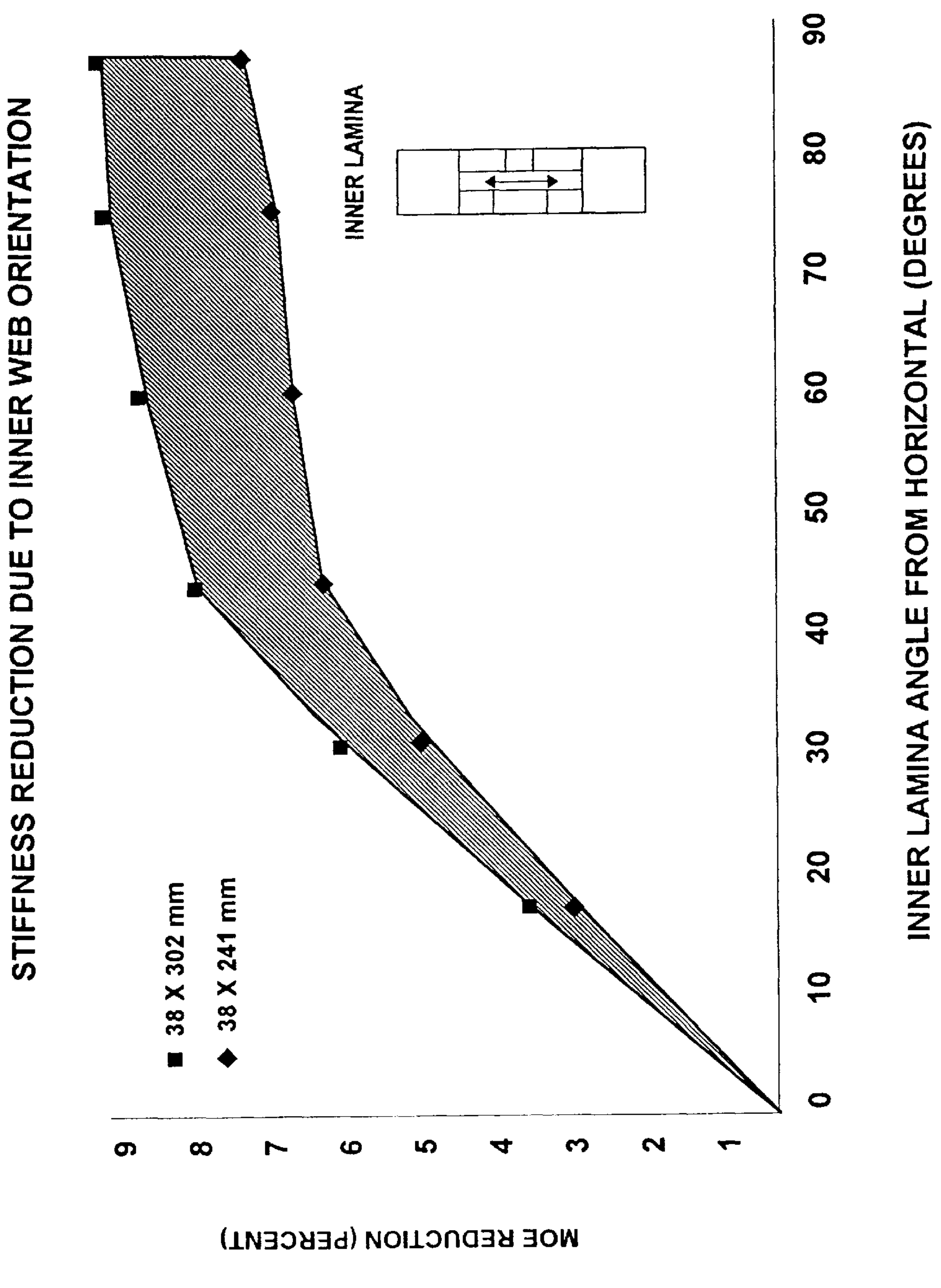
FIG. 24 is a graph showing the effect of grain orientation of the inner ply of a three ply first component on product stiffness.

FIG. 24 shows the effect on stiffness due to orientation of the inner member of a three lamina first component in a product such as is shown in FIGS. 7, 8, or 10 for product sizes 38×241 mm (1½×9½ in) and 38×302 mm (1½×11⅞ in). The loss in stiffness is relatively linear up to about a 45° inner lamina grain orientation. Beyond that point there is little additional loss. In these samples all surfaces were bonded.

Figure 25:
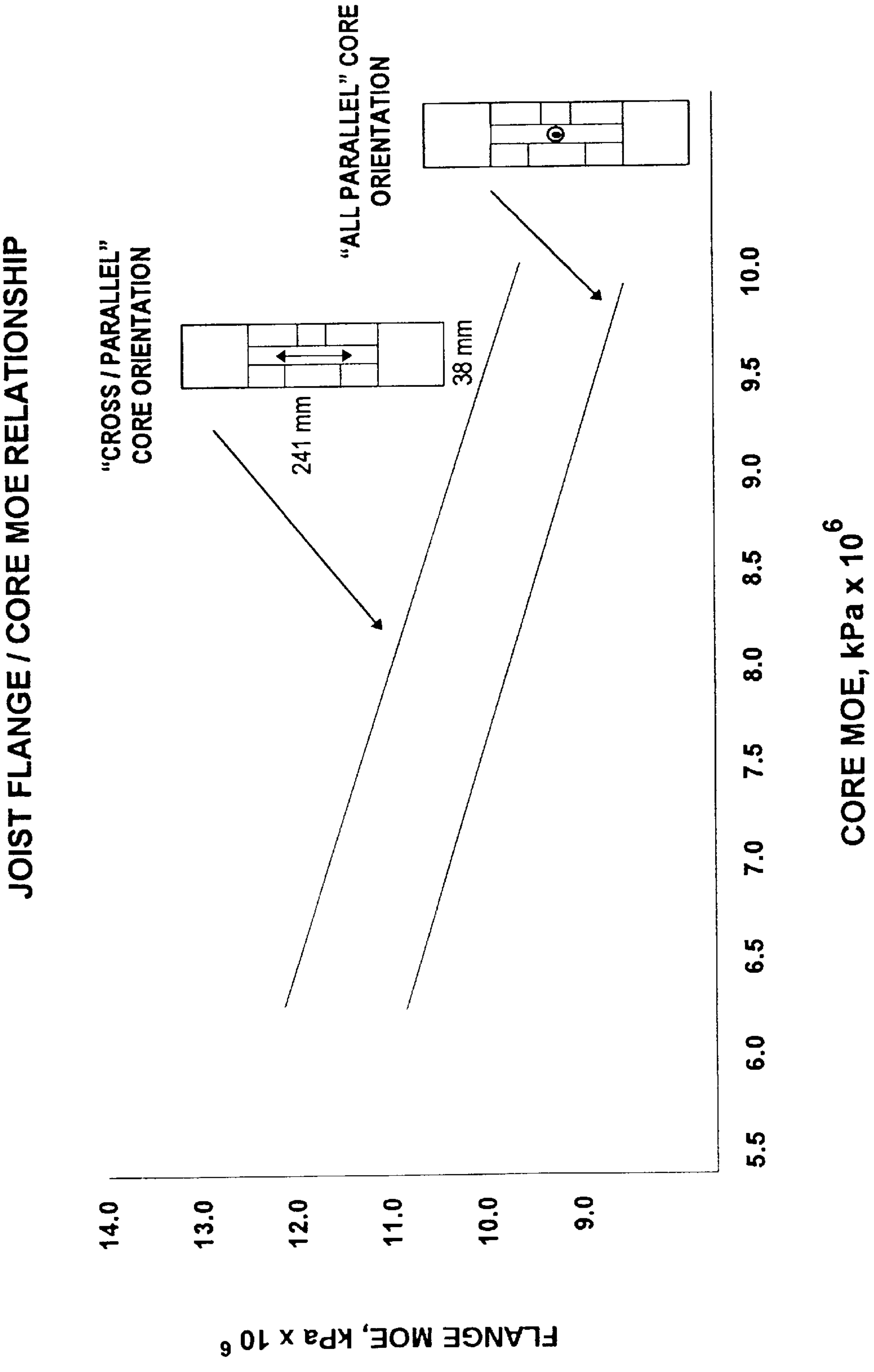
FIG. 25 is a graph showing relationship between first and second component modulus of elasticity to achieve a specified performance in either of two constructions.

FIG. 25 shows the flange/core modulus of elasticity relationship for constructions similar to those of FIGS. 7, 8, or 10 and FIGS. 9 and 11 to give performance equivalent to that of a commercial composite I-beam 38×241 mm (1½×9½ in). The commercial product is made with flange portions of solid sawn wood 38×38 mm in cross section having an oriented strandboard web 9.5 mm (⅜ in) in thickness. Thus for any given first component core MOE of the products of the present invention the required second component edge or flange MOE can be determined or vice versa for the two constructions shown.

Figure 26:
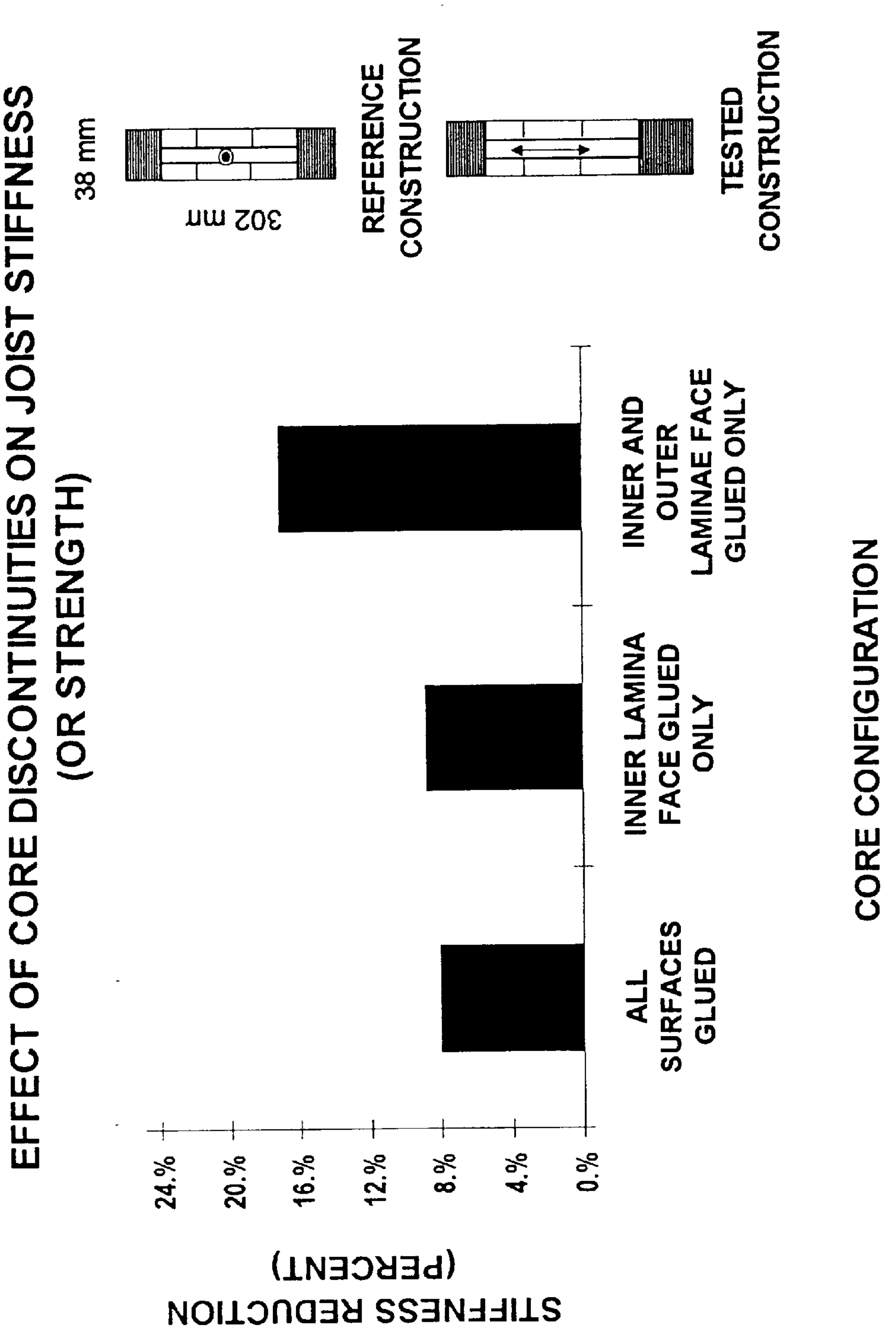
FIG. 26 is a bar graph showing relationship of stiffness to product construction.

The bar graphs of FIG. 26 show the effects on strength of gluing discontinuities in the first component core portion of the product. The product is 38×302 mm (1½×11⅞ in) in outside dimensions. A base line product used for comparison is one in which the center lamina is oriented with the grain direction parallel to the longitudinal dimension, as shown in FIG. 9. All adjoining surfaces are glued in the parallel laminated baseline product. When the MOE of the second or flange component averages about $1.1\times10^7$ kPa ($1.6\times10^6$ psi) and the first or core component $6.9\times10^6$ kPa ($1.0\times10^6$ psi), then the graph shows the decrease in stiffness of three modified constructions compared with the baseline product. In all of these the first component is made of three laminae of sliced wood with the grain direction of the center lamina oriented 90° to the longitudinal axis, as shown in FIG. 7. The middle lamina in this product will be assembled from a multiplicity of relatively narrow pieces placed edge-to-edge. In the construction represented by the first bar all of the strips of the middle lamina are face glued to the outer lamina and edge glued to each other. All strips of the outer lamina, such as 12, 12' in FIG. 7, are edge glued. There is about an 8.1% loss in bending stiffness caused by reorientation of the center lamina. When the center lamina strips are not edge glued to each other but all other conditions remain the same there is only a very minor additional loss of bending stiffness, 8.9% vs 8.1%. However, when neither the middle lamina strips or outer laminae strips are edge glued strength loss increases considerably. Here there is a 17.0% loss of bending stiffness from that of the baseline product.

Whether or not all adjoining surfaces are glued is dependent on a number of factors. These include the particular manufacturing process equipment chosen and the requirements of the ultimate end use of the product. In some cases a lower bending stiffness of the product may be tolerable or this can be compensated for by making the second component somewhat deeper or by selecting higher MOE strips for this component. The construction of FIG. 7 is in general preferred because of the better dimensional stability noted earlier. However, there maxi be a significant manufacturing advantage if the middle lamina need not be edge glued. For example, some wane on the edges would then be tolerable, resulting in higher recovery. Small gaps between these strips are also permissible without deleterious effect on product strength. The incremental sacrifice in strength when the middle lamina is face glued only is so minimum that there is no pressing need to edge glue this portion of the product.

A very significant feature of the products of the present invention is the uniformity of its strength and stiffness properties in comparison with visually graded solid sawn lumber. One measure of comparison that may be used is Coefficient of Variation (COV) of the respective products. Coefficient of Variation for a sample population is a statistic calculated by (Standard Deviation×100) divided by the Mean Value and is expressed as a percentage. It is of particular use for comparing the relative spreads of two populations having differing means. Visually graded solid sawn nominal 2"×10" No. 2 southern yellow pine lumber has an assigned stiffness rating (MOE) of $1.10\times10^7$ kPa ($1.6\times10^6$ psi) with an associated COV of 25%. Even machine stress rated lumber, which represents only about 2% of the lumber available in the market, is selected and controlled with a COV of 15% or less for MOE. An equivalent structure to the solid sawn 2"×10" made according to the examples of the present invention; e.g., FIG. 7, has a similar stiffness rating but a COV of only 10%. This is about the same as the composite I-beams noted earlier but with the advantages and convenience of use of solid sawn products. With the narrower spread of strength properties, design specifications need not be as significantly inflated to account for the known variability in the product.

Having thus disclosed the best modes of product construction and the method of their manufacture, it will be readily apparent to those skilled in the art that many variations not shown or described can be made without departing from the spirit of the invention. These variations should be considered to be within the embrace of the invention if they fall within the limits set out in the following claims.

We claim:

1. An engineered structural wood product of controlled and predictable strength properties formed from radially anisotropic pine or Douglas-fir plantation wood logs having relatively higher density and modulus of elasticity wood in their outer portions and relatively lower density and modulus of elasticity wood in their inner portion-s which comprises an elongated wood product of generally rectangular cross section having edge and mid portions, the opposite edge portions being the relatively higher density and modulus of elasticity wood selectively cut from the outer portion of the logs, said edge portions having a modulus of elasticity of at least $9.6 \times 10^6$ kPa, said edge portions being adhesively bonded to a generally rectangular mid portion formed from the relatively lower density and modulus of elasticity inner part of the logs.

2. The wood product of claim 1 in which the relatively higher density material is bonded to opposite edges of the product in a balanced manner.

3. The wood product of claim 1 in which both edge and mid portions are formed from a plurality of strips formed from the log, said strips being segregated as to density and adhesively reassembled so that each edge portion selected from the relatively higher density outer wood constitutes at least about 10% by volume of the product.

4. The wood product of claim 1 in which at least the mid portion is formed from a plurality of solid sawn strips.

5. The wood product of claim 4 in which the sawn mid portion strips are adhesively bonded to form a unitary member.

6. The wood product of claim 1 in which the edge and mid portions are formed from a plurality of veneer strips.

7. The wood product of claim 6 in which the veneer strips are adhesively bonded to form a unitary member.

8. The wood product of claim 6 in which the grain direction of all the mid portion strips is in the longitudinal direction.

9. The wood product of claim 6 in which the mid portion comprises at least three veneer laminae with the grain direction of outer laminae being in the longitudinal direction and the grain direction of at least one interior lamina being oriented 0° to 90° to the grain direction of the outer strips.

10. The wood product of claim 9 in which the grain direction of the interior laminae is oriented 90° to that of the outer strips.

11. The wood product of claims 5 or 7 in which the mid portion laminae are only face glued to form a unitary member.

12. The wood product of claims 5 or 7 in which the mid portion laminae are face and edge glued.

13. The wood product of claims 5 or 7 in which the mid portion laminae are face, edge, and end glued.

14. The wood product of claim 6 in which the veneer strips are rotary cut veneer.

15. The wood product of claim 6 in which the veneer strips are sliced veneer.

16. The wood product of claim 3 which has longer and shorter cross sectional dimensions and the planes of the strips forming the edge portions are oriented parallel to the longer cross sectional dimension.

17. The wood product of claim 3 which has longer and shorter cross sectional dimensions and the planes of the strips forming the edge portions are oriented 90° to the longer cross sectional dimension.

18. The wood product of claims 6 in which the strips forming the edge portions are oriented to lie in the same plane as the veneer laminae forming the mid section.

19. The wood product of claims 6 in which the planes of the strips forming the edge portions are oriented 90° to the plane of the veneer laminae forming the mid section component.

20. The wood product of claims 5 or 7 in which the edge component strips are cut with edges essentially parallel to the bark bearing surface of the log.

21. The wood product of claim 1 which further comprises spline members on the mid portion to key it into the outer portions.

22. The wood product of claim 1 which further comprises a spline member on the outer portions to key them into the mid portion.

23. The wood product of claim 9 in which the outermid portion laminae are oriented so that the surfaces closest to the center of the log face each other.

24. The wood product of claim 9 in which the outer mid portion laminae are oriented so that the surfaces closest to the center of the log face away from each other.

25. An engineered structural wood product of controlled and predictable strength properties strength properties formed from radially anisotropic pine or Douglas-fir plantation wood logs having relatively higher density and modulus of elasticity wood in their outer portions and relatively lower density and modulus of elasticity wood in their inner portions which comprises an elongated wood product of generally rectangular cross section having edge and mid portions, the edge portions being the relatively higher density and modulus of elasticity wood selectively cut from the outer portion of the logs, said edge portions having a modulus of elasticity of at least $9.6 \times 10^6$ kPa, said edge portions being adhesively bonded in a balanced manner to opposite edges of a generally rectangular mid portion formed from the relatively lower density and modulus of elasticity inner part of the logs, said product having a stress rating at least equivalent to visually graded No. 2 southern yellow pine of similar dimensions but with the stress values of the product having a Coefficient of Variation not exceeding about 10%.

* * * * *